(12) United States Patent
An et al.

(10) Patent No.: US 12,418,098 B2
(45) Date of Patent: *Sep. 16, 2025

(54) ANTENNA AND ELECTRONIC DEVICE INCLUDING THE SAME

(71) Applicant: SAMSUNG ELECTRONICS CO., LTD., Suwon-si (KR)

(72) Inventors: Seongyong An, Suwon-si (KR); Hyeonuk Kang, Suwon-si (KR); Jiho Kim, Suwon-si (KR); Kyungmoon Seol, Suwon-si (KR); Kyihyun Jang, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,302

(22) Filed: Apr. 2, 2024

(65) Prior Publication Data

US 2024/0250409 A1 Jul. 25, 2024

Related U.S. Application Data

(63) Continuation of application No. 17/511,910, filed on Oct. 27, 2021, now Pat. No. 11,949,149, which is a
(Continued)

(30) Foreign Application Priority Data

Oct. 30, 2020 (KR) .................. 10-2020-0143807

(51) Int. Cl.
*H01Q 1/24* (2006.01)
*H01Q 1/38* (2006.01)
*H04B 1/38* (2015.01)

(52) U.S. Cl.
CPC ................. *H01Q 1/24* (2013.01); *H01Q 1/38* (2013.01); *H04B 1/38* (2013.01)

(58) Field of Classification Search
CPC ............... H01Q 1/24; H01Q 1/38; H04B 1/38
See application file for complete search history.

(56) References Cited

U.S. PATENT DOCUMENTS 9,658,647 B1 * 5/2017 Safar ........................ G06F 1/163
10,963,014 B1 * 3/2021 Park ....................... G06F 1/1652
(Continued)

FOREIGN PATENT DOCUMENTS

| CN | 101809812 A | 8/2010 |
| CN | 110830618 A | 2/2020 |

(Continued)

OTHER PUBLICATIONS

U.S. Appl. No. 17/511,910, filed Oct. 27, 2021, An et al.
(Continued)

*Primary Examiner* — Raymond S Dean
(74) *Attorney, Agent, or Firm* — Nixon & Vanderhye P.C.

(57) ABSTRACT

According to various embodiments, an electronic device includes: a first housing including a first area, a second housing coupled to be slidable in a first direction from the first housing and including a second area overlapping the first area in a slide-in state, an antenna structure disposed in the first housing to overlap the first area when the first housing is viewed from the top, a conductive part disposed in the second area and electromagnetically connected to the antenna structure in the slide-in state, and wireless communication circuitry electrically connected to the antenna structure. The wireless communication circuitry may be configured to transmit and/or receive radio signals in at least one designated frequency band through the antenna structure and the conductive part in the slide-in state.

20 Claims, 18 Drawing Sheets

Related U.S. Application Data continuation of application No. PCT/KR2021/014098, filed on Oct. 13, 2021.

(56) References Cited

U.S. PATENT DOCUMENTS

| | | |
|---|---|---|
| 11,949,149 B2 | 4/2024 | An et al. |
| 2010/0227657 A1 | 9/2010 | Mashima et al. |
| 2011/0254744 A1 | 10/2011 | Sumi |
| 2012/0252542 A1 | 10/2012 | Hiraoka et al. |
| 2017/0141820 A1 | 5/2017 | Kim et al. |
| 2017/0244163 A1 | 8/2017 | Yoo et al. |
| 2017/0264003 A1* | 9/2017 | Jung ............... H01Q 1/243 |
| 2018/0048359 A1 | 2/2018 | Kim et al. |
| 2018/0103132 A1* | 4/2018 | Prushinskiy ........... G06F 1/16 |
| 2018/0181164 A1* | 6/2018 | Chen ................ G06F 1/1624 |
| 2019/0261519 A1 | 8/2019 | Park et al. |
| 2019/0281146 A1 | 9/2019 | Jang et al. |
| 2020/0033913 A1 | 1/2020 | Yang |
| 2020/0051468 A1 | 2/2020 | Jung et al. |
| 2020/0350939 A1 | 11/2020 | Lee et al. |
| 2021/0135492 A1 | 5/2021 | Kim et al. |
| 2021/0219437 A1 | 7/2021 | Kim et al. |
| 2022/0368786 A1* | 11/2022 | Kim ................. G06F 1/1686 |

FOREIGN PATENT DOCUMENTS

| | | |
|---|---|---|
| KR | 1094770 | 12/2011 |
| KR | 10-2017-0056246 | 5/2017 |
| KR | 2017-0098107 | 8/2017 |
| KR | 10-2019-0101184 | 8/2019 |
| KR | 10-2019-0115888 | 10/2019 |
| KR | 10-2019-0143029 | 12/2019 |
| KR | 2019-0143029 | 12/2019 |
| KR | 10-2020-0121518 | 10/2020 |
| WO | 2010-073418 A1 | 7/2010 |
| WO | 2019/245165 | 12/2019 |
| WO | WO 2020/141692 A1 | 7/2020 |

OTHER PUBLICATIONS

Search Report and Written Opinion issued Jan. 17, 2022 in counterpart International Patent Application No. PCT/KR2021/014098.

Extended European Search Report dated Dec. 22, 2023 issued in European Patent Application No. 21886617.6.

Korean Office Action dated Nov. 18, 2024 for KR Application No. 10-2020-0143807.

India Office Action dated May 28, 2024 for IN Application No. 202317013789.

Chinese Office Action dated Jul. 2, 2025 for CN Application No. 202180072855.3.

European Office Action dated Aug. 6, 2025 for EP Application No. 21886617.6.

\* cited by examiner

ANTENNA AND ELECTRONIC DEVICE INCLUDING THE SAME

CROSS-REFERENCE TO RELATED APPLICATIONS

This application is a Continuation of U.S. application Ser. No. 17/511,910, filed Oct. 27, 2021 (U.S. Pat. No. 11,949, 149), which is a Continuation of International Application No. PCT/KR2021/014098 filed Oct. 13, 2021, which claims priority to KR 10-2020-0143807 filed Oct. 30, 2020, the entire contents of which are all hereby incorporated herein by reference in their entireties.

BACKGROUND

Field

The disclosure relates to an antenna and an electronic device including the same.

Description of Related Art

An electronic device gradually becomes slim, and is developed to increase stiffness and enhance a design aspect and also to differentiate between functional elements thereof. The electronic device has its shape gradually changed into various shapes away from a uniform rectangular shape. The electronic device may have a deformable structure which can be easily carried and can also use a large-screen display. For example, as part of a deformable structure, an electronic device may have a structure (e.g., a rollable structure or a slidable structure) in which a display area is varied through at least two housings operating in a sliding way and a flexible display supported by the two housings. Such an electronic device may require an antenna capable of having excellent radiation performance regardless of a sliding operation and/or a rolling operation.

An electronic device may include a deformable slidable electronic device (e.g., a rollable electronic device) capable of inducing the expansion of a display area when being used. The slidable electronic device may include a first housing (e.g., a base housing, a base bracket or a base structure) and a second housing (e.g., a slide housing, a slide bracket or a slide structure) which may be coupled in a way to be movable to each other in at least partially fitted-together way. For example, the second housing may change a display area of a flexible display by being slid in or out in a designated direction and a designated distance from the first housing. The second housing may be coupled in a way to support at least a part of the flexible display (or an expandable display) and to operate at least partially in a sliding way from the first housing, and may induce a change in the display area by being manually slid in or out by a user or having its state automatically changed into a slide-in state or a slide-out state through an internal driving mechanism.

The slidable electronic device may include at least one antenna disposed in the first housing including substantially most of electrical structures, such as a substrate, a sensor module or a battery. The at least one antenna may be configured to transmit or receive a radio signal in at least one designated frequency band by being electrically connected to wireless communication circuitry disposed in an internal space of the first housing and/or the substrate. The at least one antenna may include a conductive part disposed in a dielectric structure (e.g., an antenna carrier) disposed in the internal space of the first housing or formed through at least one non-conductive part in at least a part of an external appearance of the housing.

However, in the slidable electronic device, if the second housing is disposed to be slidable from the first housing, the space in which the antenna is arranged may not be affordable due to a portion mutually overlapped in the slide-in state and an operating area of the flexible display. Alternatively, if at least one antenna is disposed in a corresponding area of the first housing overlapping the second housing in the slide-in state, radiation performance may deteriorate due to interference. Such a deterioration phenomenon may become more severe if a corresponding area of the second housing overlapping the first housing is made of a metal material.

SUMMARY

Embodiments of the disclosure can provide an antenna having an improved degree of freedom in a part design because an antenna mounting space is secured regardless of an overlap area of two housings and an electronic device including the same.

Embodiments of the disclosure can provide an electronic device including an antenna having designated radiation performance regardless of a slide-in/slide-out operation.

According to various example embodiments, an electronic device includes: a first housing including a first area, a second housing coupled to be slidable in a first direction from the first housing and including a second area overlapping the first area in a slide-in state, an antenna structure disposed in the first housing to overlap the first area when the first housing is viewed from the top, a conductive part disposed in the second area and electromagnetically connected to the antenna structure in the slide-in state, and wireless communication circuitry electrically connected to the antenna structure. The wireless communication circuitry may be configured to transmit and/or receive radio signals in at least one designated frequency band through the antenna structure and the conductive part in the slide-in state.

The electronic device according to various example embodiments of the present disclosure can provide an electrical connection structure which enables a surrounding conductive structure to operate as a part of the antenna by electrically connecting, to the antenna, the surrounding conductive structure overlapping the antenna in a slide-in operation. Accordingly, the antenna can maintain stable radiation performance regardless of a sliding operation.

In addition, various effects directly or indirectly understood through this document may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In relation to the description of the drawings, the same or similar reference numerals may be used with respect to the same or similar constituent elements.

DETAILED DESCRIPTION

Figure 1:
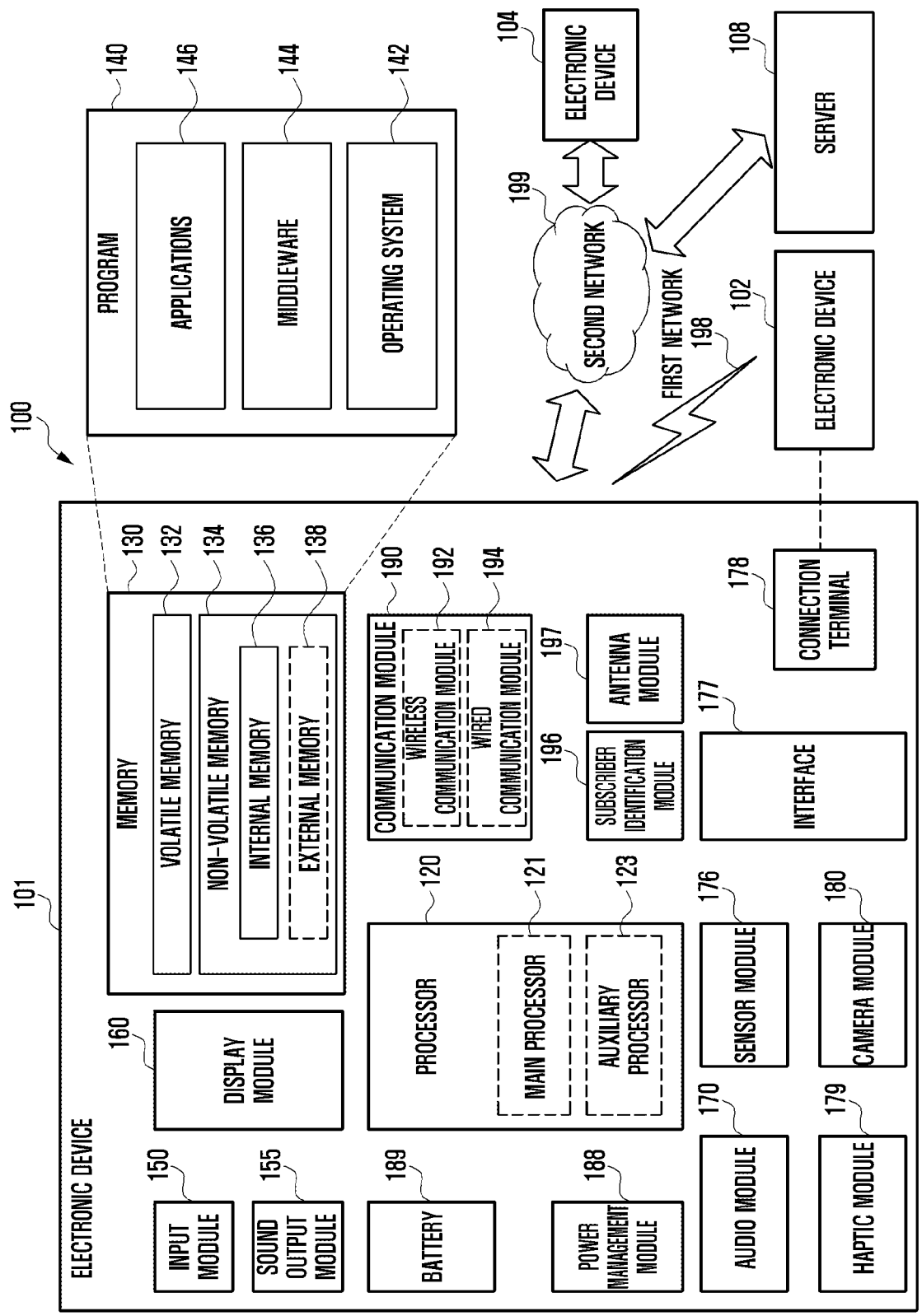
FIG. 1 is a block diagram of illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
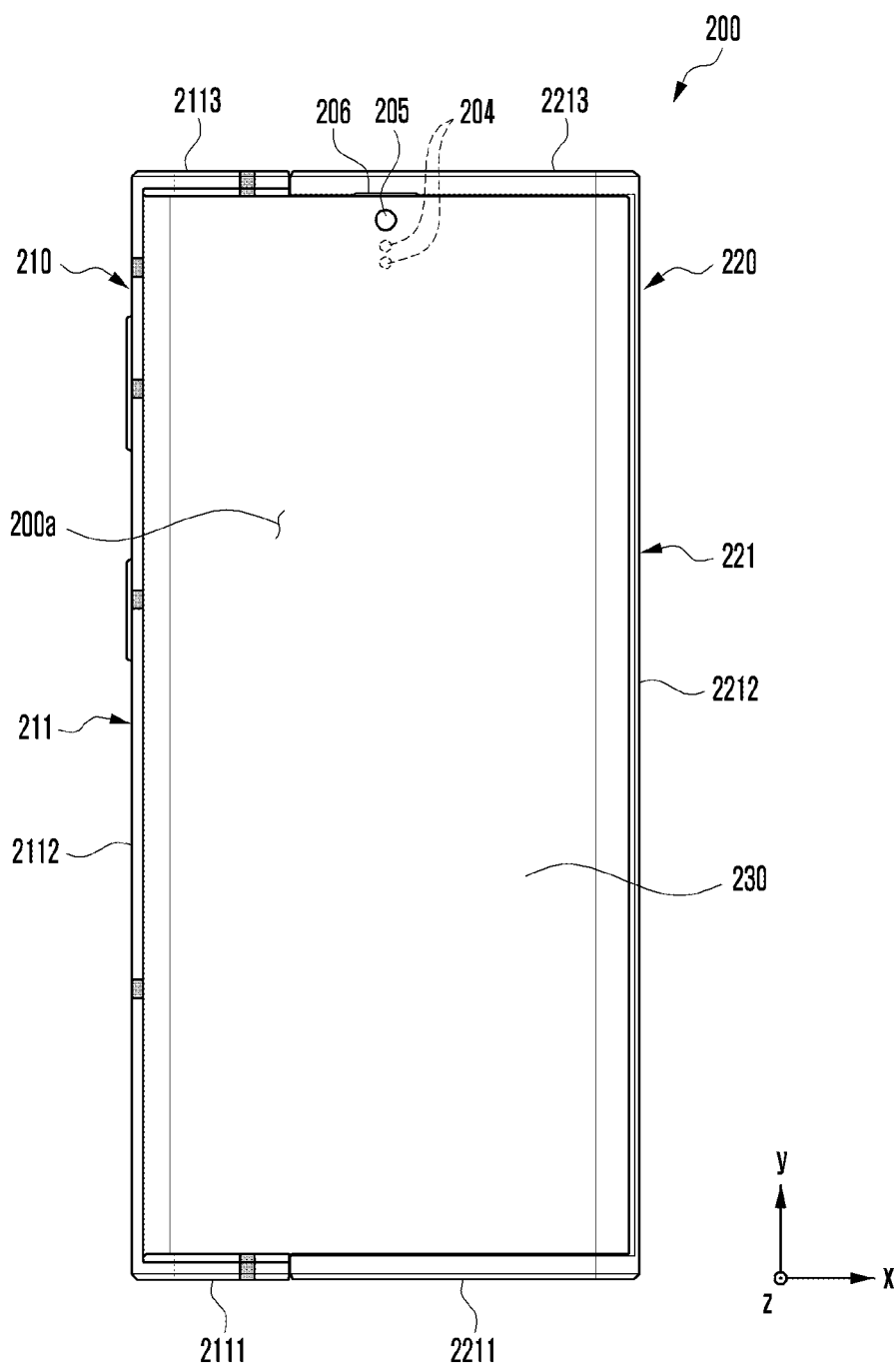
FIGS. 2A and 2B are diagrams illustrating the front of an electronic device in a slide-in state and a slide-out state, respectively, according to various embodiments.
Figure 2B:
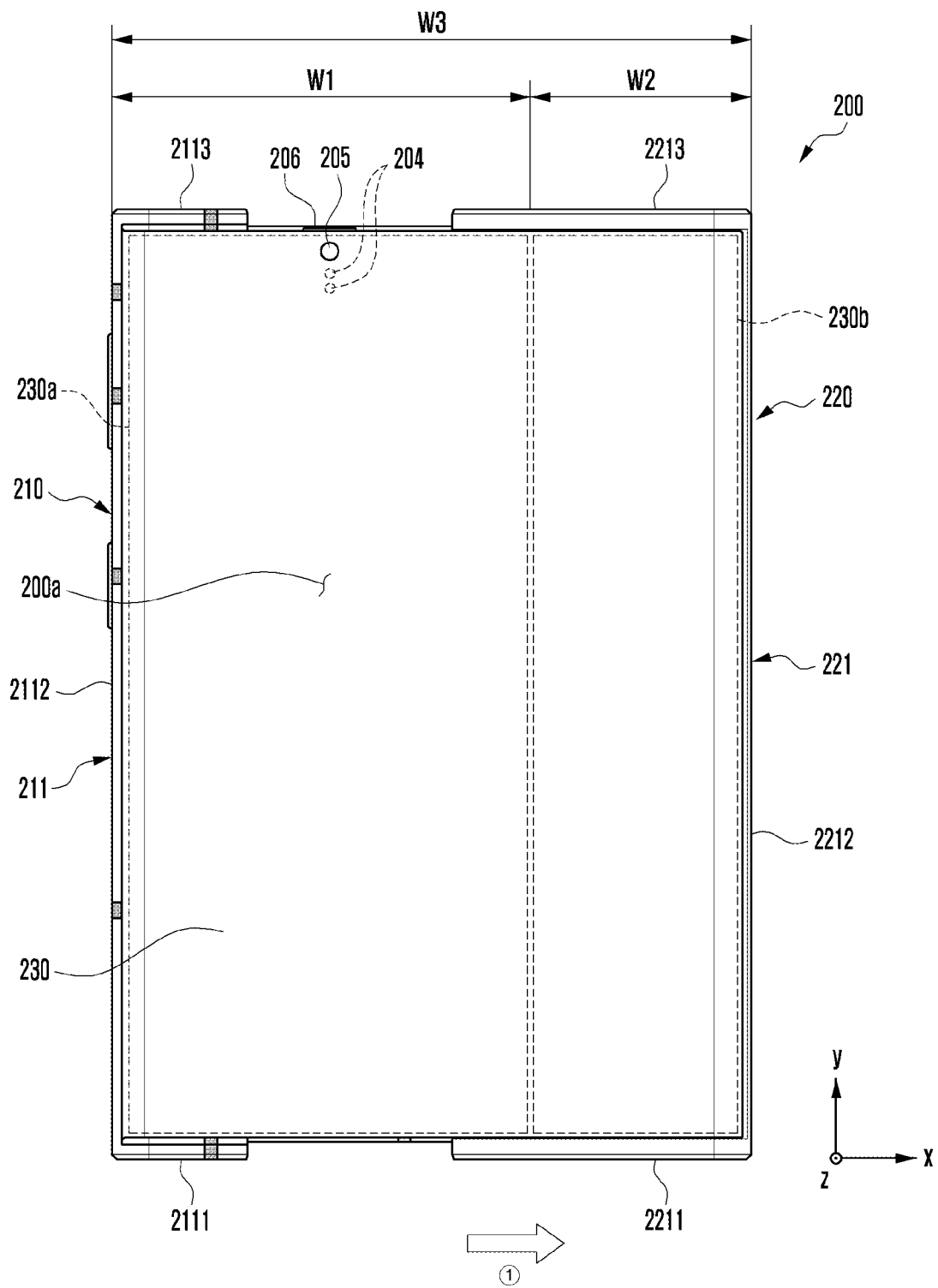
Figure 3A:
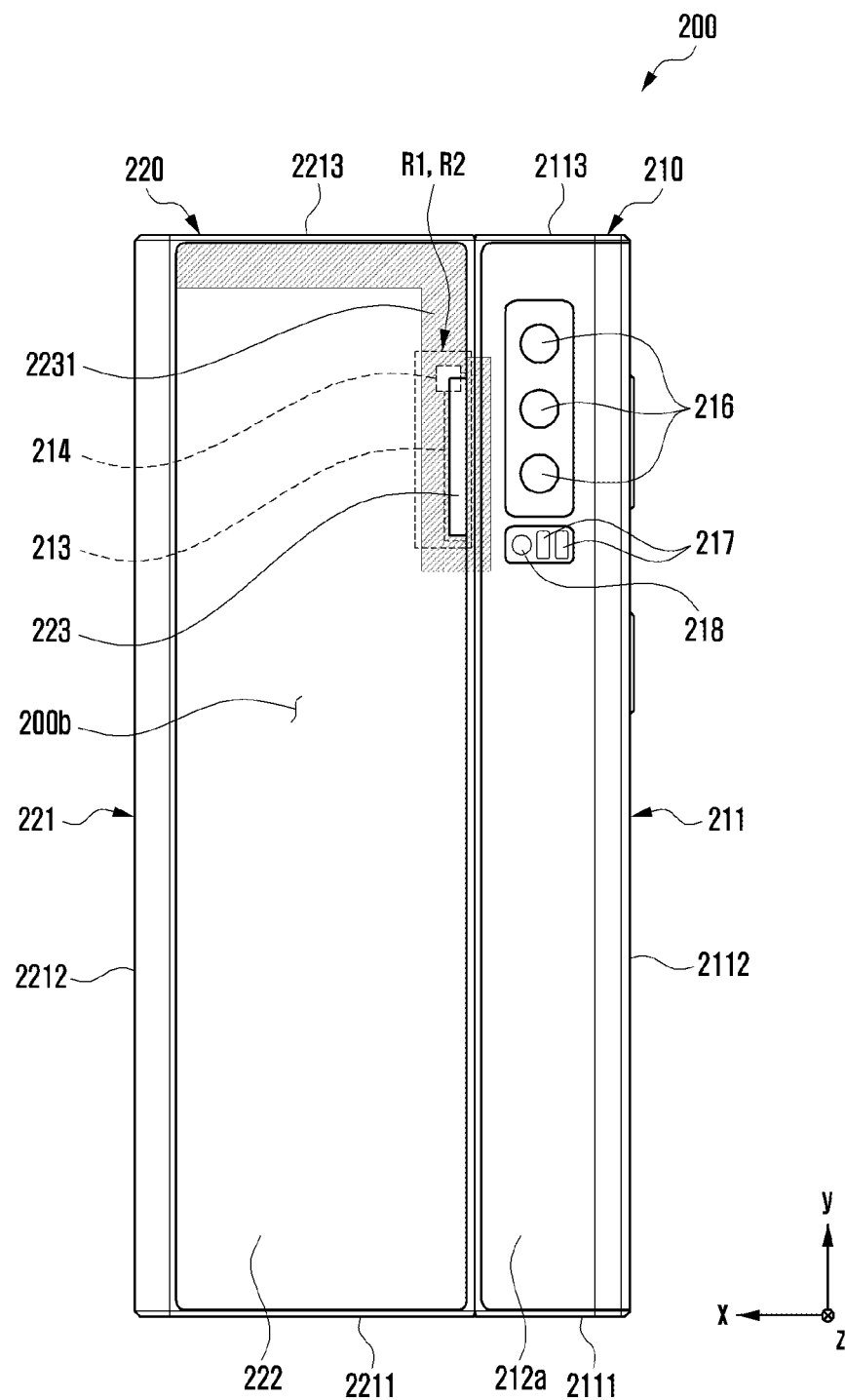
FIGS. 3A and 3B are diagrams illustrating the rear of the electronic device in the slide-in state and the slide-out state, respectively, according to various embodiments.
Figure 3B:
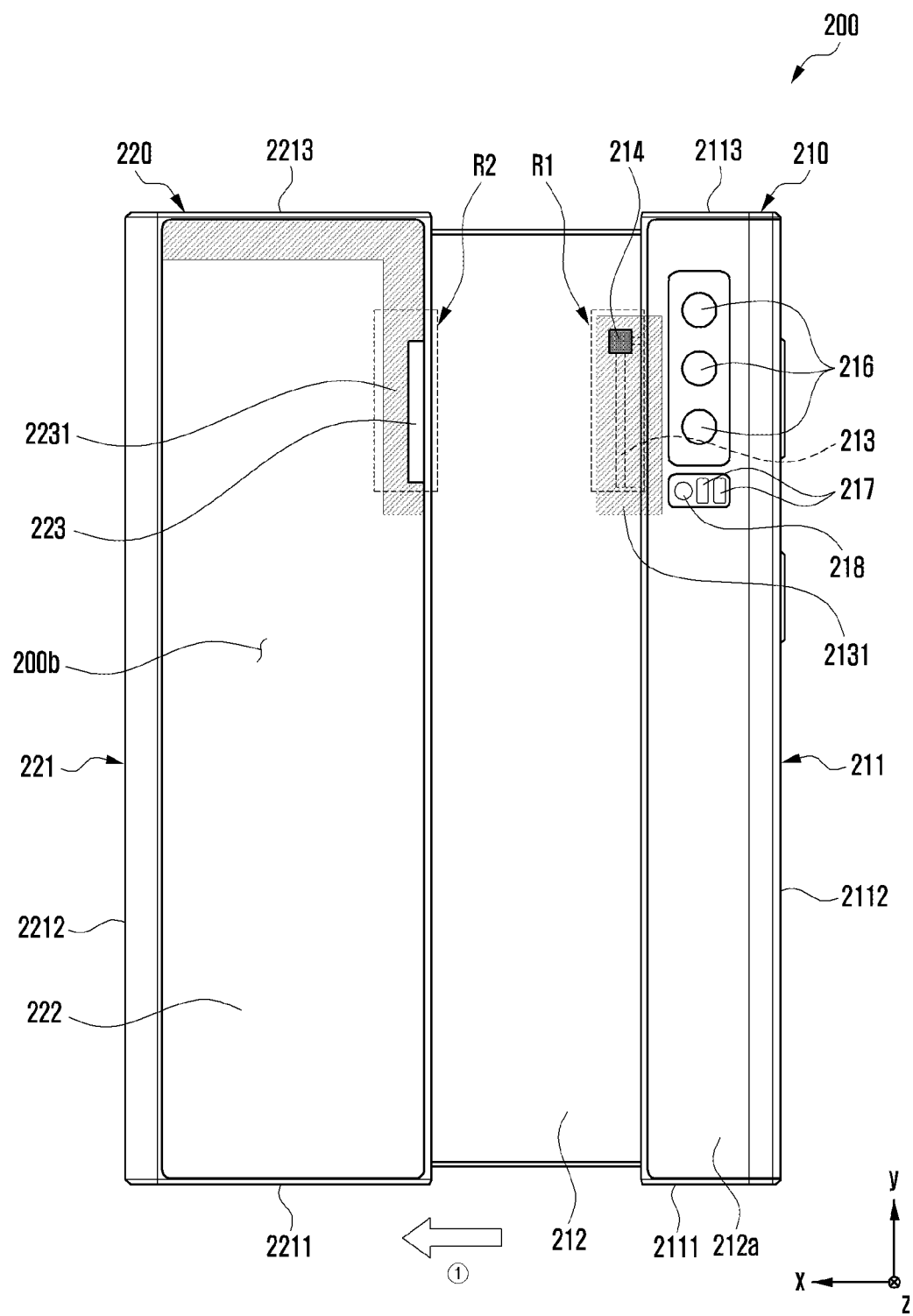

FIGS. 2A and 2B are diagrams illustrating the front of an electronic device in a slide-in state and a slide-out state, respectively, according to various embodiments. FIGS. 3A and 3B are diagrams illustrating the rear of the electronic device in the slide-in state and the slide-out state, respectively, according to various embodiments.

Referring to FIGS. 2A, 2B, 3A and 3B, the electronic device 200 may include a first housing 210 (e.g., a base housing), a second housing 220 (e.g., a slide housing) coupled to be movable from the first housing 210 in a designated direction (e.g., an X axis direction) within a designated round trip, and a flexible display 230 (e.g., an expandable display) disposed to be supported through at least a part of the first housing 210 and the second housing 220. According to an embodiment, the electronic device 200 may include a bendable member (or a bendable support member) (e.g., a bendable member 240 in FIG. 5A) (e.g., a hinge rail, bendable support or a multi-joint hinge module) which forms the same plane along with at least a part of the first housing 210 in the slide-out state and is received in an internal space (e.g., a second space 2201 in FIG. 5A) of the second housing 220 in the slide-in state. According to an embodiment, at least a part of the flexible display 230 may be disposed to be not seen from the outside by being received in the internal space (e.g., the second space 2201 in FIG. 5A) of the second housing 220 while being supported by a bendable member (e.g., the bendable member 240 in FIG. 5A) in the slide-in state. According to an embodiment, at least a part of the flexible display 230 may be disposed to be seen from the outside while being supported by a bendable member (e.g., the bendable member 240 in FIG. 5A) that forms at least partially the same plane along with the first housing 210 in the slide-out state.

According to various embodiments, the electronic device 200 may include a front 200a (e.g., a first face), a rear 200b (e.g., a second face) facing a direction opposite to the front 200a, and a side (not illustrated) surrounding the space between the front 200a and the rear 200b. According to an embodiment, the electronic device 200 may include the first housing 210 including a first side member 211 and the second housing 220 including a second side member 221. According to an embodiment, the first side member 211 may include a first side 2111 having a first length in a first direction (the X axis direction), a second side 2112 extended to have a second length longer than the first length in a direction substantially perpendicular to the first side 2111, and a third side 2113 extended from the second side 2112 in substantially parallel to the first side 2111 and having the first length. According to an embodiment, the first side member 211 may be made of at least partially a conductive material (e.g., metal). According to an embodiment, at least a part of the first side member 211 may include a first support member 212 extended up to at least a part of an internal space (e.g., a first space 2101 in FIG. 5A) of the first housing 210.

According to various embodiments, the second side member 221 may include a fourth side 2211 facing the first side 2111 and having a third length, a fifth side 2212 extending from the fourth side 2211 in a direction substantially parallel to the second side 2112 and having a fourth length longer than the third length, and a sixth side 2213 extending from the fifth side 2212 substantially in parallel to the third side 2113 and having the third length. According to an embodiment, the second side member 221 may be made of at least partially a conductive material (e.g., metal). According to an embodiment, at least a part of the second side member 221 may include a second support member 222 extended up to at least a part of an internal space (e.g., the second space 2201 in FIG. 5A) of the second housing 220. According to an embodiment, each of the first side 2111 and the fourth side 2211, and the third side 2113 and the sixth side 2213 may be coupled to be mutually slidable. According to an embodiment, in the slide-in state, at least a part of the first side 2111 may be disposed to overlap at least a part of the fourth side 2211. According to an embodiment, in the slide-in state, at least a part of the third side 2113 may be disposed to overlap at least a part of the sixth side 2213. According to an embodiment, in the slide-in state, at least a part of the first support member 212 of the first side member 211 may be disposed to overlap the second support member 222 of the second side member 221. In an embodiment, the first support member 212 may include a non-overlap part 212a not overlapping the second support member 222 in the slide-in state. In an embodiment, in the slide-in state, the non-overlap part 212a may be formed separately from the first support member 212 and coupled without overlapping the second support member 222. According to an embodiment, the non-overlap part 212a may be used as an area where electronic parts (e.g., the camera module 216, the sensor module 217 or the flash 218) are disposed. According to an embodiment, the area of the front 200a and rear 200b of the electronic device 200 may be varied depending on the slide-in state and slide-out state of the electronic device 200. In an embodiment, the electronic device 200 may include a first rear cover (not illustrated) disposed in at least a part of the first housing 210 and a second rear cover (not illustrated) disposed in at least a part of the second housing 220 in the rear 200b. In such a case, the first rear cover and/or the second rear cover may be integrated and formed with the side members 211 and 221, respectively. According to an embodiment, the first rear cover and/or the second rear cover may be made of polymer, coating or colored glass, ceramic, metal (e.g., aluminum, stainless steel (STS), or magnesium), or a combination of at least two of the materials. In an embodiment, the first rear cover and/or the second rear cover may be extended up to at least a part of the side members 211 and 221, respectively. In an embodiment, the first support member 212 may be substituted with the first rear cover. The second support member 222 may be substituted with the second rear cover.

According to various embodiments, the electronic device 200 may include the flexible display 230 disposed to be supported by at least a part of the first housing 210 and the second housing 220. According to an embodiment, the flexible display 230 may include a first part 230a (e.g., a plane unit) always seen from the outside and a second part 230b (e.g., a bendable part) extended from the first part 230a and slid in an internal space (e.g., the first space 2201 in FIG. 5A) of the second housing 220 in a way to be not seen from the outside in the slide-in state. According to an embodiment, the first part 230a may be disposed to be supported by the first housing 210. The second part 230b may be disposed to be supported by a bendable member (e.g., the bendable member 240 in FIG. 5A). According to an embodiment, the second part 230b of the flexible display 230 may be disposed to slide in an internal space (e.g., the second space 2201 in FIG. 5A) of the second housing 220 and to be not exposed to the outside in the slide-in state of the electronic device 200. The second part 230b may be extended from the first part 230a while being supported by a bendable member (e.g., the bendable member 240 in FIG. 5A) and may be exposed to the outside in a way to form substantially the same plane as the first part 230a, in the state in which the electronic device 200 has slid out in the designated first direction (a direction ①). Accordingly, the display area of the flexible display 230 of the electronic device 200 may be varied as the second housing 220 moves in the designated first direction (e.g., the direction ①) from the first housing 210.

According to various embodiments, the first housing 210 may be slidably coupled in a way to be at least partially slid out from the second housing 220 or slid in at least a part of the second housing 220. According to an embodiment, the electronic device 200 may be configured to have a first width W1 from the second side 2112 to the fourth side 2212 in the slide-in state. According to an embodiment, the electronic device 200 may be configured to have a third width W3 greater than the first width W1 because a bendable member (e.g., the bendable member 240 in FIG. 5A) slid in an internal space (e.g., the second space 2201 in FIG. 5A) of the second housing 210 is moved to have an additional second width W2 in the slide-out state. For example, the flexible display 230 may have a display area substantially having the first width W1 in the slide-in state, and may have an extended display area substantially having the third width W3 in the slide-out state.

According to various embodiments, the second housing 220 may be operated through a manipulation of a user. For example, a state of the electronic device 200 may change into the slide-out state through a manipulation of a user who presses an external surface of the flexible display 230 in the designated first direction (e.g., the direction ①) in the slide-in state. In an embodiment, the second housing 220 of the electronic device 200 may be slid out in the designated first direction (e.g., the direction ①) through a manipulation of a button (not illustrated) of a locker (not illustrated) exposed to the outside. In an embodiment, the second housing 220 may be automatically operated through a driving mechanism (e.g., a driving motor, a deceleration module and/or a gear assembly) disposed in an internal space (e.g., the first space 2101 in FIG. 5A) of the first housing 210 and/or an internal space (e.g., the second space 2201 in FIG. 5A) of the second housing 220. According to an embodiment, the electronic device 200 may be configured to control an operation of the second housing 220 through the driving mechanism when detecting an event for a change into the slide-in/slide-out state of the electronic device 200 through a processor (e.g., the processor 120 in FIG. 1). In an embodiment, a processor (e.g., the processor 120 in FIG. 1) of the electronic device 200 may control the flexible display 230 to display an object in various ways and to execute an application program in accordance with a changed display area of the flexible display 230 in the slide-in state, the slide-out state or an intermediate state.

According to various embodiments, the electronic device 200 may include at least one of an input device (not illustrated), a sound output device 206, sensor modules 204 and 217, camera modules 205 and 216, a connector port (not illustrated), a key input device (not illustrated) or an indicator (not illustrated). In an embodiment, the electronic device 200 may be configured to omit at least one of the aforementioned elements or to additionally include other elements.

According to various embodiments, the input device may include a microphone. In an embodiment, the input device may include a plurality of microphones disposed to be capable of detecting the direction of a sound. The sound output device 206 may include a speaker. The sound output device 206 may include a receiver for communication. In an embodiment, the sound output device 206 may include an external speaker. In an embodiment, the sound output device 206 may include an operating speaker (e.g., a piezo speaker) without a separate speaker hole.

According to various embodiments, the sensor modules 204 and 217 may generate an electric signal or a data value corresponding to an operating state within the electronic device 200 or an external environment state. The sensor modules 204 and 217 may include a first sensor module 204 (e.g., a proximity sensor or an illuminance sensor) disposed in the front 200a of the electronic device 200 and/or a second sensor module 217 (e.g., a heart rate monitoring (HRM) sensor) disposed in the rear 200b thereof, for example. According to an embodiment, the first sensor module 204 may be disposed under the flexible display 230 in the front 200a of the electronic device 200. According to an embodiment, the first sensor module 204 and/or the second sensor module 217 may include at least one of a proximity sensor, an illuminance sensor, a time of flight (TOF) sensor, an ultrasonic sensor, a fingerprint recognition sensor, a gesture sensor, a gyro sensor, an atmosphere sensor, a magnetic sensor, an acceleration sensor, a grip sensor, a color sensor, an infrared (IR) sensor, a bio sensor, a temperature sensor or a humidity sensor.

According to various embodiments, the camera modules 205 and 216 may include a first camera module 205 disposed in the front 200a of the electronic device 200 and a second camera module 216 disposed in the rear 200b thereof. According to an embodiment, the electronic device 200 may include a flash 218 disposed near the second camera module 216. According to an embodiment, the camera modules 205 and 216 may include one or a plurality of lenses, an image sensor and/or an image signal processor. According to an embodiment, the first camera module 205 may be disposed under the flexible display 230 and configured to photograph a subject through a part of an activation area of the flexible display 230. According to an embodiment, the flash 218 may include a light-emitting diode or a xenon lamp, for example.

According to various embodiments, the first camera module 205 of the camera modules 205 and 216 and some sensor modules 204 of the sensor modules 204 and 217 may be disposed to detect an external environment through the flexible display 230. For example, the first camera module 205 or some sensor modules 204 may be disposed to neighbor an external environment through an opening or a transmission area perforated in the flexible display 230 in an internal space of the electronic device 200. According to an embodiment, an area that faces the first camera module 205 of the flexible display 230 may be formed as a transmission area having designated transmittance as a part of an area where content is displayed. According to an embodiment, the transmission area may be formed to have transmittance having a range of about 5% to about 20%. Such a transmission area may include an area through which light for generating an image by being focused by the image sensor passes and which overlaps a valid area (e.g., a view angle area) of the first camera module 205. For example, the transmission area of the flexible display 230 may include an area in which the density and/or wiring density of pixels is lower than that of surrounding pixels. For example, the transmission area may substitute the aforementioned opening. For example, some camera modules 205 may include an under display camera (UDC). In an embodiment, some sensor modules 204 may be disposed to perform functions thereof without being visually exposed through the flexible display 230 in an internal space of the electronic device 200.

According to various embodiments, the electronic device 200 may include at least one antenna structure 213 (e.g., at least one antenna) disposed in the first housing 210 and configured to transmit and/or receive a radio signal in at least one frequency band. According to an embodiment, the at least one antenna structure 213 may be disposed in a part corresponding to a first area R1 included in at least a part of the first support member 212 of the first housing 210. According to an embodiment, the first area R1 may be disposed in an area corresponding to a non-conductive part 2131 (e.g., conductor) disposed in at least some area of the first support member 212. According to an embodiment, the second housing 220 may include a conductive part 223 overlapped with the first area R1 and disposed in the second area R2 of the second support member 222 in the slide-in state. According to an embodiment, the conductive part 223 may be disposed through a non-conductive part 2231 of the second support member. According to an embodiment, the conductive part 223 may be disposed to be electromagnetically connected to the antenna structure 213 in the slide-in state. In an embodiment, the electronic device 200 may further include a conductive pad 214 electrically connected to the antenna structure 213 so as to be electromagnetically connected to the conductive part 223 in the slide-in state if the antenna structure 213 is disposed in the first housing 210. In an embodiment, the conductive part 223 may be disposed to be divided through the at least one non-conductive part 2231 in the second support member 222. In an embodiment, in the slide-in state, the electromagnetic connection structure of the antenna structure 213 and the conductive part 223 may be disposed in at least one overlap area that overlaps each other among sides (e.g., between the first side 2111 and the fourth side 2211 and/or between the third side 2113 and the sixth side 2213) of the electronic device 200.

Figure 4:
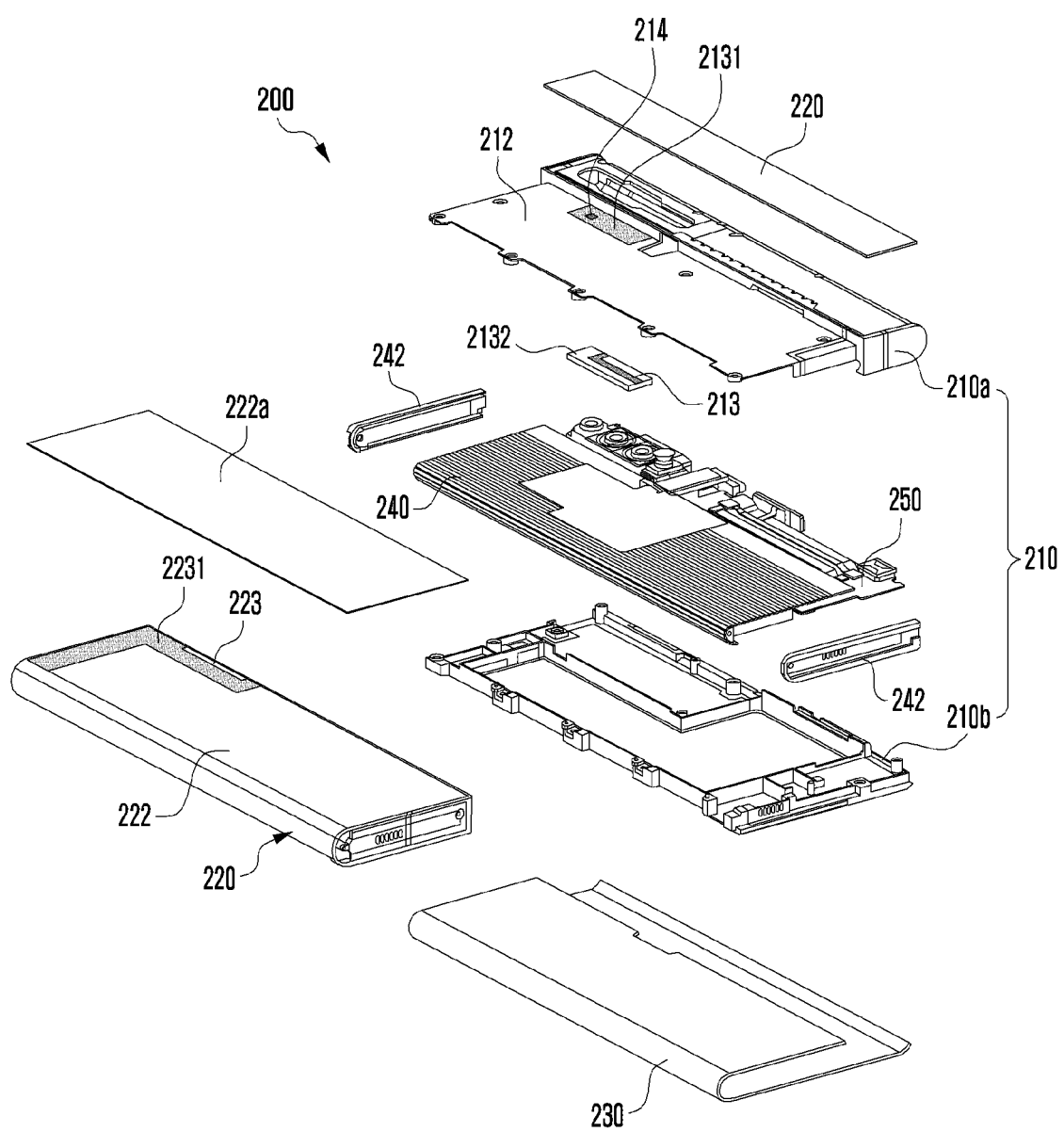
FIG. 4 is an exploded perspective view of the electronic device according to various embodiments.

FIG. 4 is an exploded perspective view of the electronic device according to various embodiments.

Referring to FIG. 4, the electronic device 200 may include the first housing 210 including a first space (e.g., the first space 2101 in FIG. 5A), the second housing 220 slidably coupled to the first housing 210 and including a second space (e.g., the second space 2201 in FIG. 5A), the bendable member 240 rotatably disposed in a second space (e.g., the second space 2201 in FIG. 5A), and the flexible display 230 disposed to be supported by the bendable member 240 and the first housing 210. According to an embodiment, a first space (e.g., the first space 2201 in FIG. 5A) of the first housing 210 may be provided through the coupling of a first bracket housing 210a and a second bracket housing 210b. In an embodiment, at least a part of the first bracket housing 210a may include the first support member 212 or may be substituted with the first support member 212. According to an embodiment, the electronic device 200 may include a substrate 250 disposed in a first space (e.g., the first space 2201 in FIG. 5A). According to an embodiment, the substrate 250 may include wireless communication circuitry (e.g., the wireless communication module 192 in FIG. 1). According to an embodiment, the electronic device 200 may include a camera module (e.g., the camera module 216 in FIG. 3A) or a sensor module (e.g., the sensor module 217 in FIG. 3A) disposed in the substrate 250 in a first space (e.g., the first space 2101 in FIG. 5A). According to an embodiment, the bendable member 240 may be disposed to have one end fixed to the first housing 210 and the other end rotatably received in a second space (e.g., the second space 2201 in FIG. 5A) of the second housing 220. For example, the bendable member 240 may be at least partially received in a second space (e.g., the second space 2201 in FIG. 5A in the slide-in state, and may be slid out from a second space (e.g., the second space 2201 in FIG. 5A) in a way to form substantially the same plane as the first housing 210 in the slide-out state. Accordingly, the display area of the flexible display 230 supported by the first housing 210 and the bendable member 240 may be varied depending on a sliding operation. According to an embodiment, the electronic device 200 may further include a guide rail 242 disposed on the side of the coupled first bracket housing 210a and second bracket housing 210b, for being guided into an internal space (e.g., the second space 2201 in FIG. 5A) of the second housing 220. In an embodiment, the electronic device 200 may further include a cover member 222a disposed to cover the second support member 222 of the second housing 220.

According to various embodiments, the electronic device 200 may include the antenna structure 213 disposed in a first space (e.g., the first space 2201 in FIG. 5A) of the first housing 210. According to an embodiment, the antenna structure 213 may be disposed through a dielectric structure 2132 (e.g., an antenna carrier). In such a case, the antenna structure 213 may include a laser direct structuring (LDS) pattern. In an embodiment, the antenna structure 213 may include a conductive pattern directly disposed on the substrate 250. In an embodiment, the antenna structure 213 may include at least one conductive part divided through at least one non-conductive part in the first support member 212. According to an embodiment, the dielectric structure 2132 including the antenna structure 213 may be disposed at a location corresponding to the non-conductive part 2131 formed in the first support member 212 of the first housing 210, and may be electrically connected to the conductive pad 214 disposed in the first support member 212. According to an embodiment, the second housing 220 may include the conductive part 223 formed to be divided through the non-conductive part 2231 in the second support member 222. For example, in the slide-in state, at least a part of the conductive part 223 is disposed to overlap the antenna structure 213 and electromagnetically connected through the conductive pad 214, thereby being capable of reducing the deterioration of radiation performance of the antenna structure 213 attributable to interference of the second housing 220. According to an embodiment, the electronic device 200 may further include a matching circuit (not illustrated) in order transmit and/or receive a signal having a designated frequency band using the antenna structure 213 in the slide-in state or the slide-out state. For example, the matching circuit may include at least one of an inductor, a capacitor or a switch.

Figure 5A:
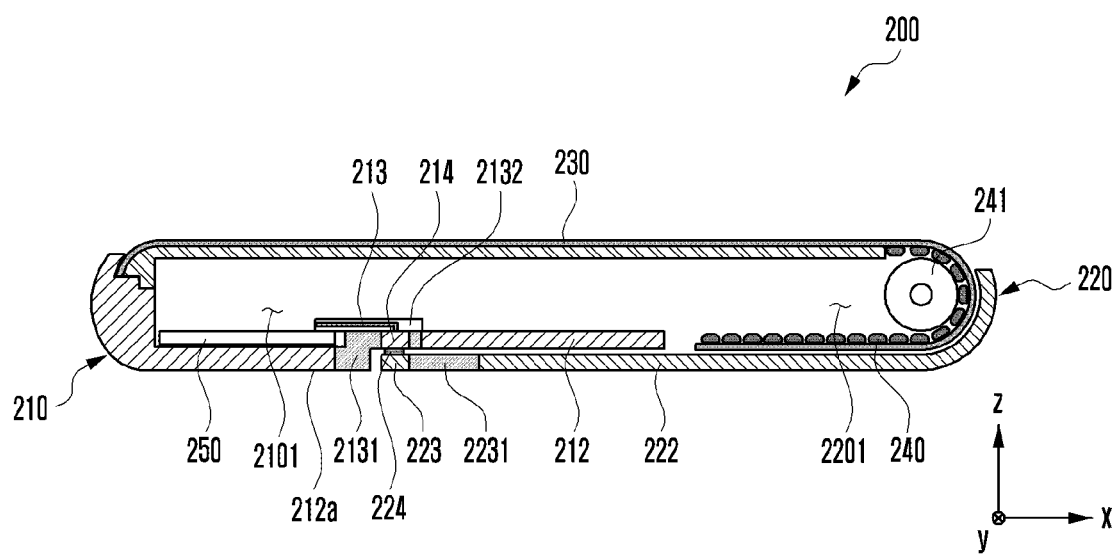
FIGS. 5A and 5B are cross-sectional views of the electronic device in the slide-in state and slide-out state of the electronic device, respectively, according to various embodiments.
Figure 5B:
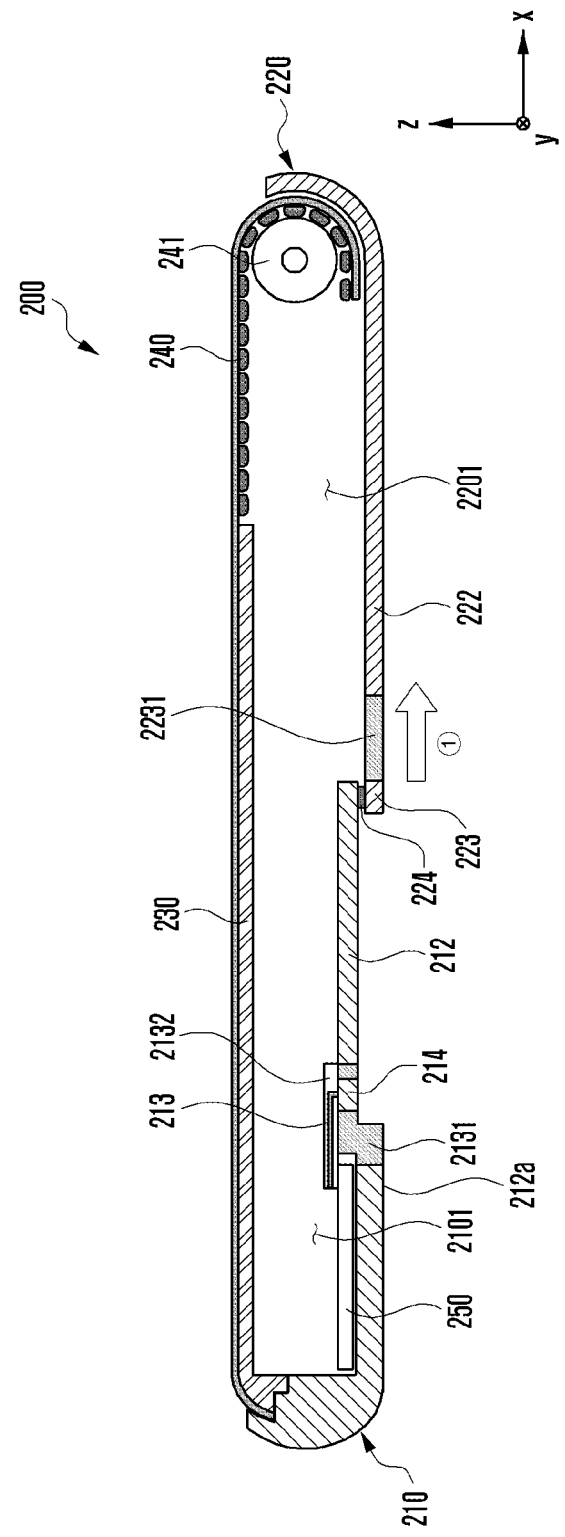

FIGS. 5A and 5B are cross-sectional views of the electronic device in the slide-in state and slide-out state, respectively, of the electronic device according to various embodiments.

Referring to FIGS. 5A and 5B, the electronic device 200 may include the first housing 210 including the first space 2101, the second housing 220 including the second space 2201 disposed to be slidable in a designated direction (the X axis direction) within a designated round trip from the first housing 210, the bendable member 240 coupled to the first housing 210 and disposed to be supported through a support 241 (e.g., a support roller) disposed in the second housing 220, and the flexible display 230 disposed to be supported by the first housing 210 and the bendable member 240. According to an embodiment, the flexible display 230 may be disposed to have a first display area (e.g., an area corresponding to the first width W1 in FIG. 2B) by being at least partially slid in the second space 2201 of the second housing 220 through the support of the bendable member 240 in the slide-in state. According to an embodiment, the flexible display 230 may be disposed to have a second display area (e.g., an area corresponding to the third width W3 in FIG. 2B) greater than the first display area by being at least partially slid out from the second space 2201 to the outside through the support of the bendable member 240 in the slide-out state.

According to various embodiments, the first housing 210 may include the antenna structure 213 disposed in the first space 2101. According to an embodiment, the antenna structure 213 may be disposed in the dielectric structure 2132 (e.g., an antenna carrier). In an embodiment, the antenna structure 213 may include a conductive pattern formed on the substrate 250 disposed in the first space 2101. In an embodiment, the antenna structure 213 may include at least a part of the first support member 212 divided through the at least one non-conductive part 2131. According to an embodiment, the antenna structure 213 may be electrically connected to wireless communication circuitry (e.g., the wireless communication module 192 in FIG. 1) disposed in the substrate 250. In an embodiment, wireless communication circuitry (e.g., the wireless communication module 192 in FIG. 1) may be disposed at a location isolated from the substrate 250 in the first space 2101 of the first housing 210, and may be electrically connected to the substrate through an electrical connection member (e.g., an RF cable). According to an embodiment, the antenna structure 213 may be electrically connected to the conductive pad 214 of the first support member 212. In an embodiment, the conductive pad 214 may be divided through the non-conductive part 2131, and may be substituted with a conductive part disposed as a part of the first support member 212. According to an embodiment, when the first support member 212 is viewed from the top, an area of the first support member 212 at least partially overlapping the antenna structure 213 may help to maintain radiation performance of the antenna structure 213 because the area is formed of the non-conductive part 2131. In an embodiment, the non-conductive part 2131 may be formed to include at least a part of the non-overlap part 212a in addition to a part covered with the second support member 222 of the second housing 220 in the slide-in state.

According to various embodiments, the second housing 220 may include the conductive part 223 disposed in at least a part of the second support member 222 divided through the at least one non-conductive part 2231. According to an embodiment, the conductive part 223 may be disposed at a location at least partially overlapping the antenna structure 213 in the slide-in state when the second support member 222 is viewed from the top. According to an embodiment, the conductive part 223 may be electrically connected to the conductive pad 214 through a conductive connection member 224 disposed in the first space 2201 of the first housing 210 in the slide-in state. According to an embodiment, the conductive connection member 224 may be fixed to be electrically connected to the conductive part 223 in the internal space 2201 of the second housing 220. In an embodiment, the conductive connection member 224 may be fixed to the first housing 210 in a way to be electrically connected to the conductive pad 214. In such a case, the conductive connection member 224 may be electrically connected to the conductive part 223 of the second housing 220 in the slide-in state. According to an embodiment, the antenna structure 213 is electrically connected to the conductive part 223 of the second housing 220 through the conductive pad 214 and the conductive connection member 224 in the slide-in state, so that the deterioration of radiation performance attributable to interference of the second housing 220 can be reduced. According to an embodiment, the antenna structure 213 can maintain the state in which the antenna structure 213 has been electrically disconnected from the conductive part 223 because the conductive connection member 224 is isolated from the conductive pad 214 in the slide-out state. The conductive connection member 224 may include a C-clip or a pogo pin as a connection member having elasticity, for example.

According to various embodiments, wireless communication circuitry (e.g., the wireless communication module 192 in FIG. 1) may be configured to transmit and/or receive radio signals in at least one designated frequency band through the antenna structure 213 and the conductive part 223 in the slide-in state. According to an embodiment, wireless communication circuitry (e.g., the wireless communication module 192 in FIG. 1) may be configured to transmit and/or receive radio signals in at least one designated frequency band through only the antenna structure 213 in the slide-out state. According to an embodiment, wireless communication circuitry (e.g., the wireless communication module 192 in FIG. 1) may be configured to transmit and/or receive radio signals in at least one frequency band of a low band (e.g., about 700 MHz to 900 MHZ), a mid band (about 1700 MHZ to 2100 MHZ), a high band (about 2300 MHz to 2700 MHZ) or a sub-6 band (about 3 GHz to 6 GHZ) through the antenna structure 213 and/or the antenna structure 213 and the conductive part 223.

Figure 6A:
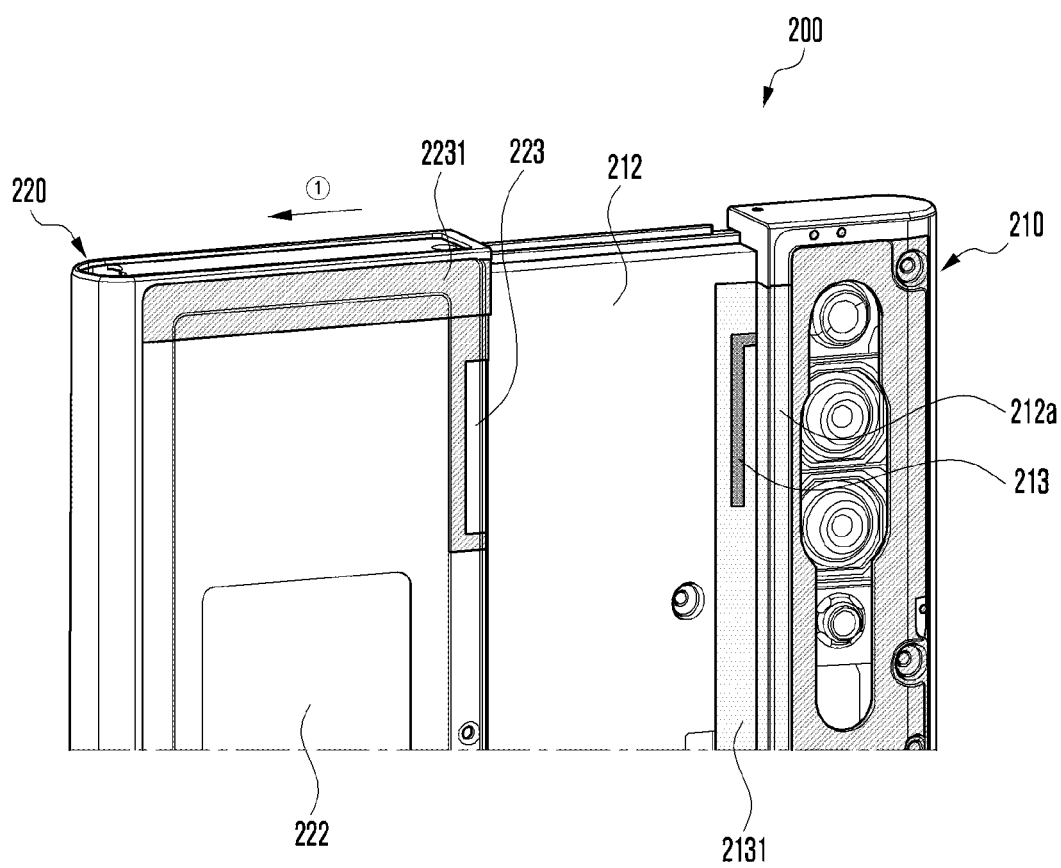
FIG. 6A is a perspective view of a part of the electronic device including an antenna structure and a conductive part according to various embodiments.
Figure 6B:
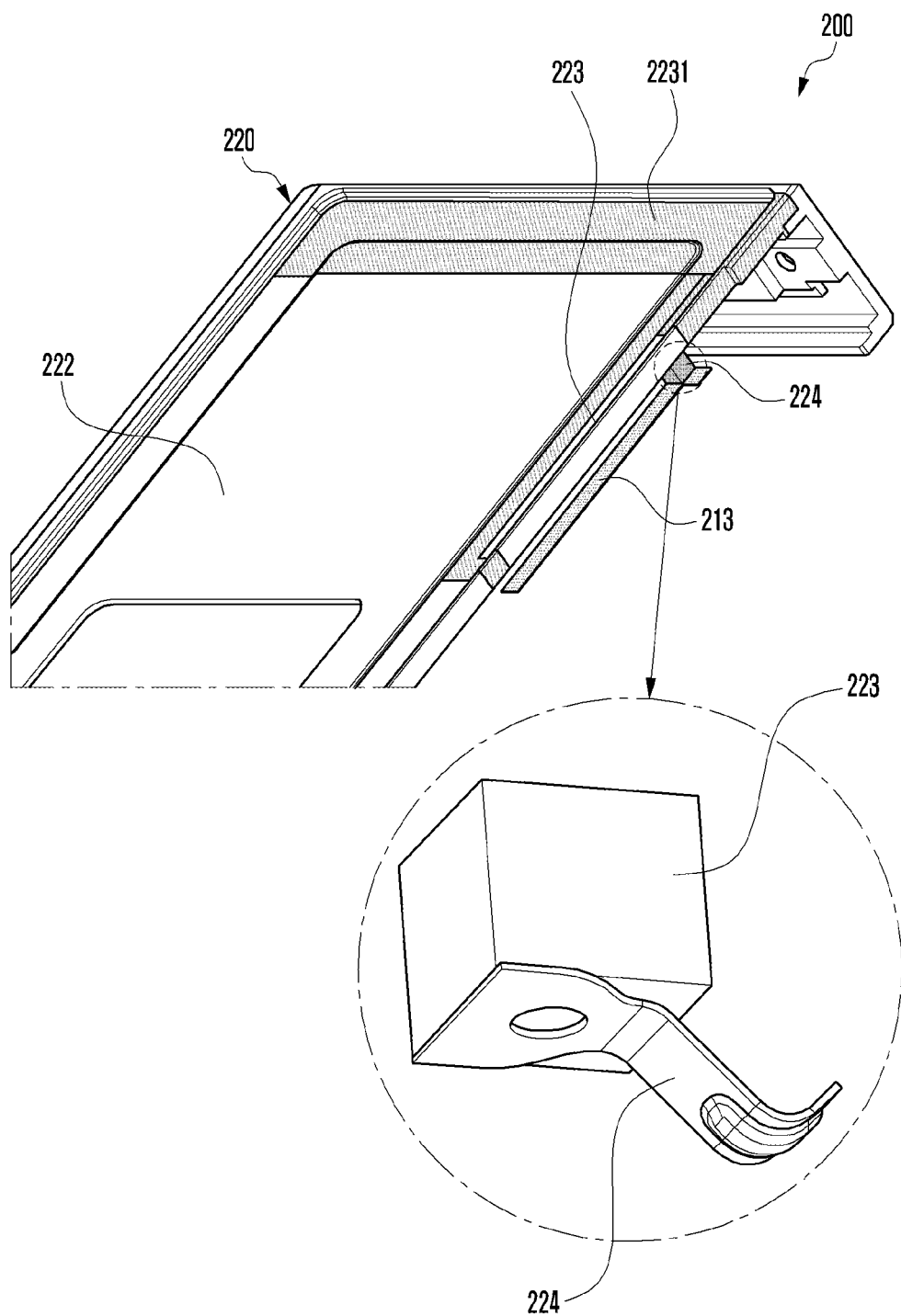
FIG. 6B is a partial perspective view illustrating the state in which the antenna structure and the conductive part have been electrically connected through a conductive connection member according to various embodiments.

FIG. 6A is a perspective view illustrating a part of the electronic device including an antenna structure and a conductive part according to various embodiments. FIG. 6B is a partial perspective view schematically illustrating the state in which the antenna structure and the conductive part have been electrically connected through the conductive connection member according to various embodiments.

Referring to FIGS. 6A and 6B, the electronic device 200 may include the first housing 210 and the second housing 220 coupled in a way to be slidable in a designated direction (e.g., the direction ①) from the first housing 210). According to an embodiment, the first housing 210 may include the first support member 212. According to an embodiment, the second housing 220 may include the second support member 222. According to an embodiment, the electronic device 200 may operate in such a way that at least a part of the first support member 212 is overlapped to be not seen from the outside by the second support member 222 in the slide-in state. According to an embodiment, the electronic device 200 may include the antenna structure 213 overlapped with the second support member 222 and disposed in a corresponding area of the first housing 210, when the first support member 212 is viewed from the top in the slide-in state. According to an embodiment, the antenna structure 213 may be formed through a conductive part divided through the non-conductive part 2131 in the first support member 212. According to an embodiment, the electronic device 200 may include the conductive part 223 at least partially overlapped with the antenna structure 213 and disposed in a corresponding area of the second support member 222, when the second support member 212 is viewed from the top in the slide-in state. According to an embodiment, the conductive part 223 may be disposed to be divided through the at least one non-conductive part 2231 disposed in the second support member 222.

According to various embodiments, the electronic device 200 may include the conductive connection member 224 for electrically and physically connecting the antenna structure 213 and the conductive part 223 in the slide-in state. According to an embodiment, the conductive connection member 224 may be disposed to be not seen from the outside between the first support member 212 and the second support member 222 in the slide-in state. In an embodiment, the conductive connection member 224 may be disposed to be not seen from the outside in the slide-out state. According to an embodiment, the conductive connection member 224 may be disposed in the second housing 220. According to an embodiment, the conductive connection member 224 may include at least one of a conductive spring, a conductive tape, a pogo pin or a conductive C-clip. According to an embodiment, the conductive connection member 224 may be fixed to the conductive part 223 through at least one of ultrasonic welding, conductive bonding, conductive taping or structural coupling.

Figure 7:
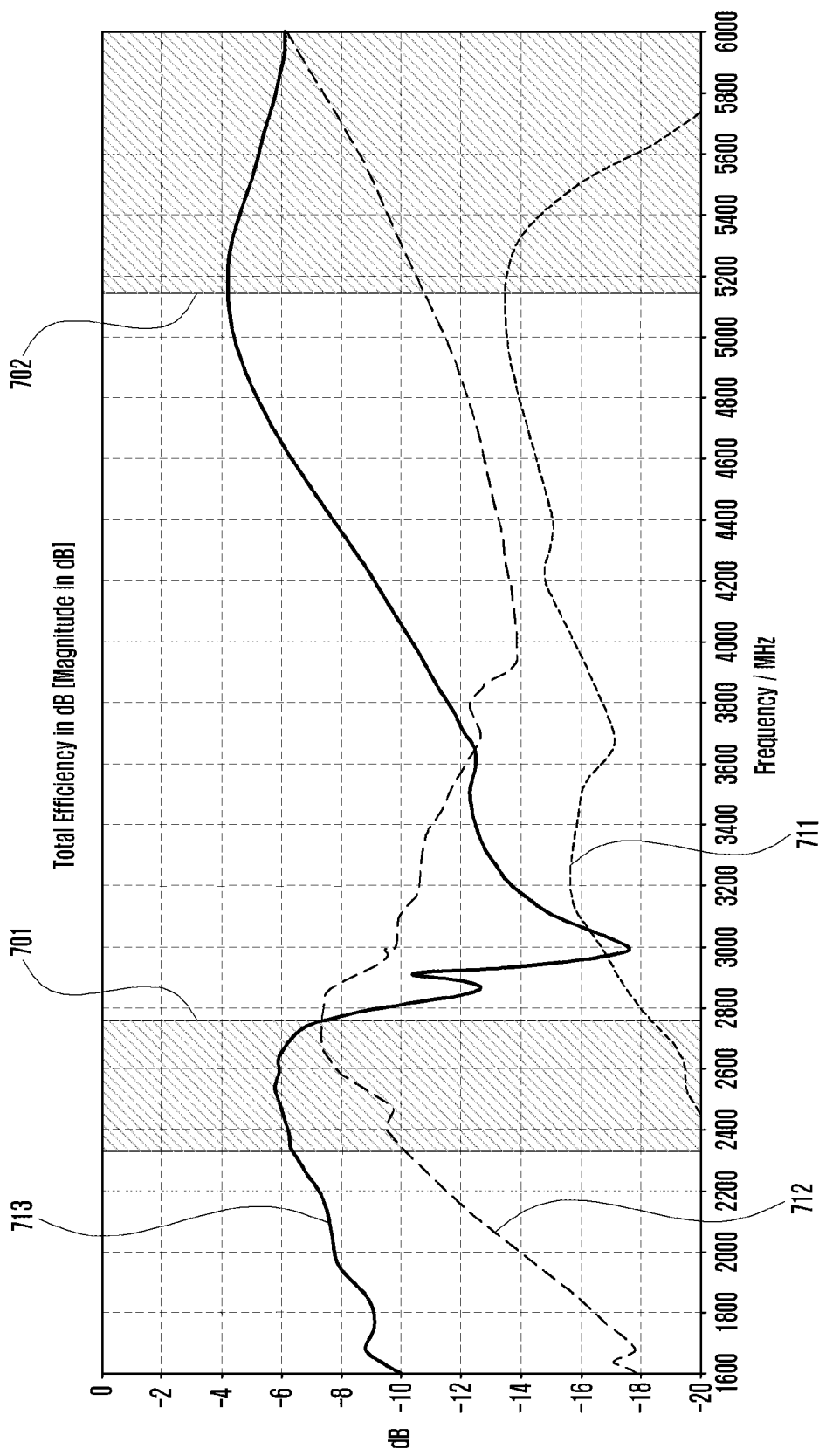
FIG. 7 is a graph comparing radiation performance of antennas depending on the presence or absence of the conductive part in FIG. 6A according to various embodiments.

FIG. 7 is a graph comparing radiation performance of antennas depending on the presence or absence of the conductive part in FIG. 6A according to various embodiments.

From FIGS. 6A, 6B and 7, it may be seen that radiation performance of the antenna structure 213 (e.g., an antenna) is suddenly decreased due to interference of the second housing 220 in the slide-in state in designated frequency bands (e.g., a high band (an area 701) and a sub-6 band (an area 702)) compared to the slide-out state (a graph 712) when the conductive part 223 is not present (a graph 711), whereas the antenna structure 213 according to an example embodiment of the present disclosure maintains a gain of 10 dB or more similar to the slide-out state (the graph 712) when the antenna structure 213 is electrically connected to the conductive part 223 (the graph 713) in the slide-in state. This may mean that the deterioration of radiation performance is reduced although the antenna structure 213 overlaps at least a part of the second housing 220 when being electromagnetically connected to the conductive part 223 in the slide-in state.

Figure 8A:
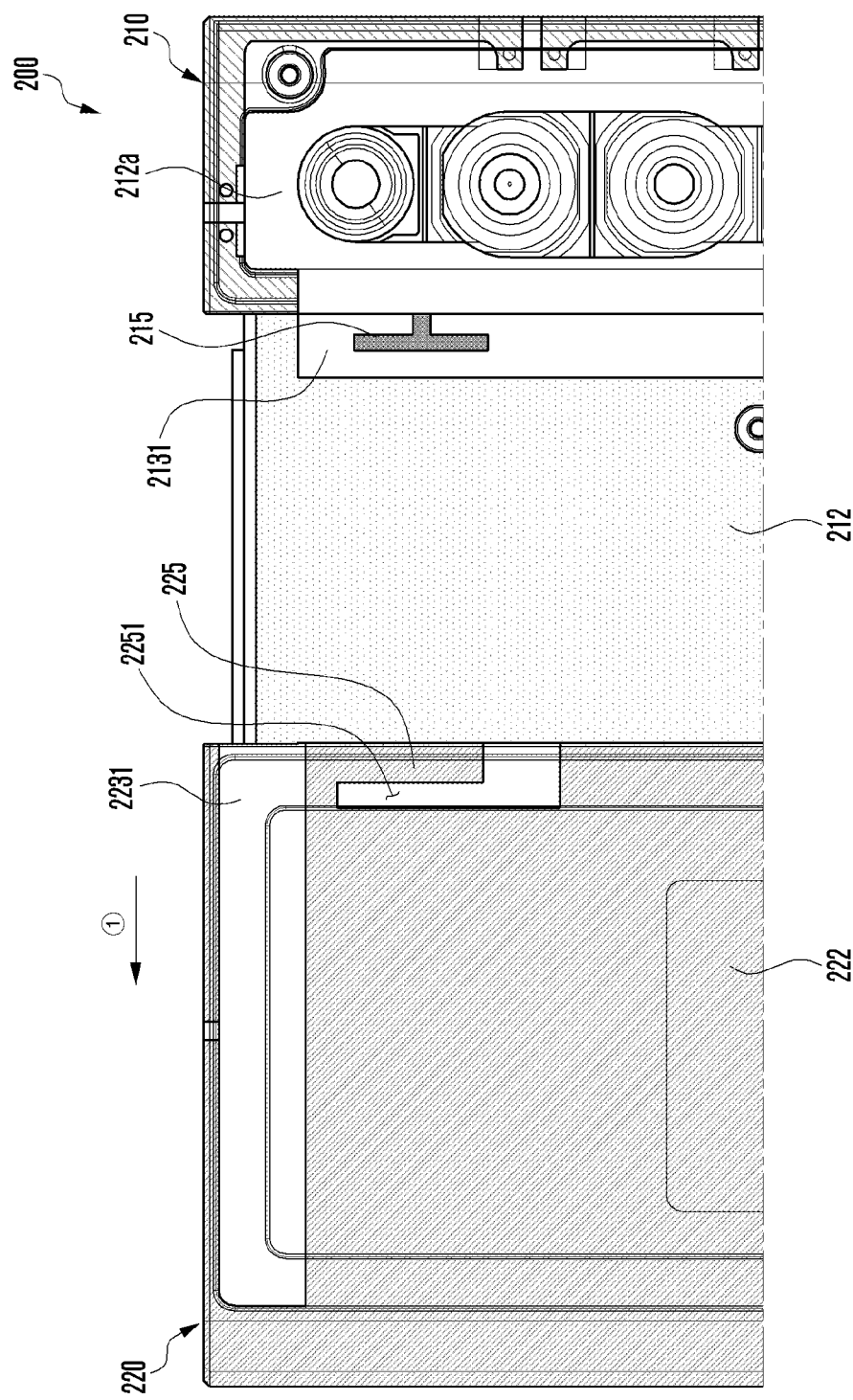
FIGS. 8A and 8B are diagrams illustrating a part of the electronic device including an antenna structure and a conductive part according to various embodiments.
Figure 8B:
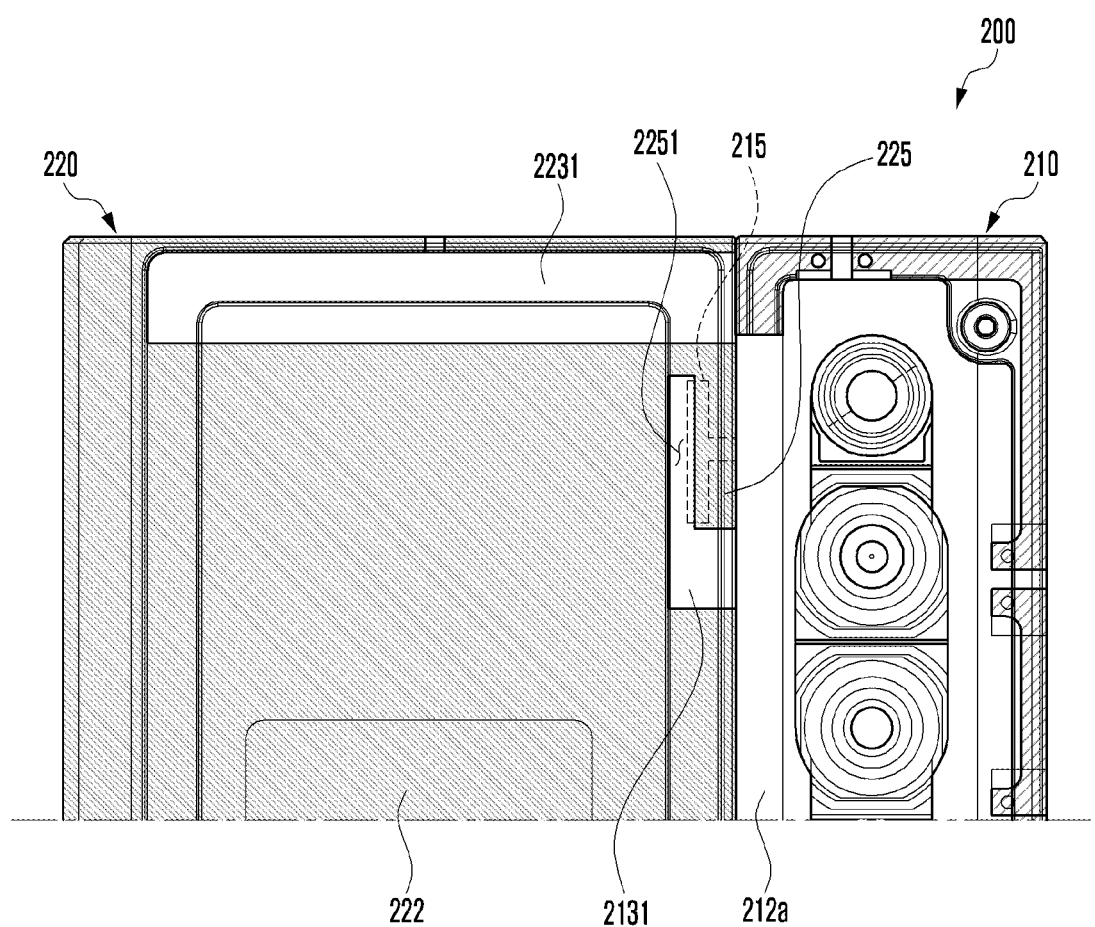

FIGS. 8A and 8B are diagrams illustrating a part of the electronic device including an antenna structure and a conductive part according to various embodiments.

In describing the electronic device 200 of FIGS. 8A and 8B, substantially the same elements as those of the electronic device 200 of FIGS. 6A and 6B have been assigned the same reference numerals, and a detailed description thereof may not be repeated here.

Referring to FIGS. 8A and 8B, the electronic device 200 may include a first housing 210 and a second housing 220 coupled in a way to be slidable in a designated direction (e.g., the direction ①) from the first housing 210. According to an embodiment, the first housing 210 may include a first support member 212. For example, the first support member 212 may be extended from a side to an internal space. According to an embodiment, the second housing 220 may include a second support member 222. For example, the second support member 222 may be extended from a side to an internal space. According to an embodiment, the electronic device 200 may operate in such a way that at least a part of the first support member 212 is overlapped to be not seen from the outside by the second support member 222 in the slide-in state. According to an embodiment, the electronic device 200 may include an antenna structure 215 overlapped with at least a part of the second support member 222 and disposed in a corresponding area of the first housing 210 when the first support member 212 is viewed from the top in the slide-in state. In an embodiment, the antenna structure 215 may be disposed within the first housing 210 or may be disposed to include a part divided through a non-conductive part in the first support member 212 made of a conductive material.

According to various embodiments, the electronic device 200 may include a conductive part 225 disposed to at least partially overlap the antenna structure 215 when the second support member 222 is viewed from the top in the slide-in state. According to an embodiment, the conductive part 225 may be formed to have a designated shape through at least one non-conductive part 2231 in the second support member 222. According to an embodiment, the conductive part 225 may be formed to be extended from the second support member 222 made of a conductive material and to have a slit 2251. According to an embodiment, the slit 2251 may be formed to have a length substantially in the same direction as the direction of a length in which an antenna structure 215 is formed. In an embodiment, the antenna structure 215 may be disposed to be electrically connected to the conductive part 225 through a conductive connection member (e.g., the conductive connection member 224 in FIG. 7B) in the slide-in state.

Figure 9:
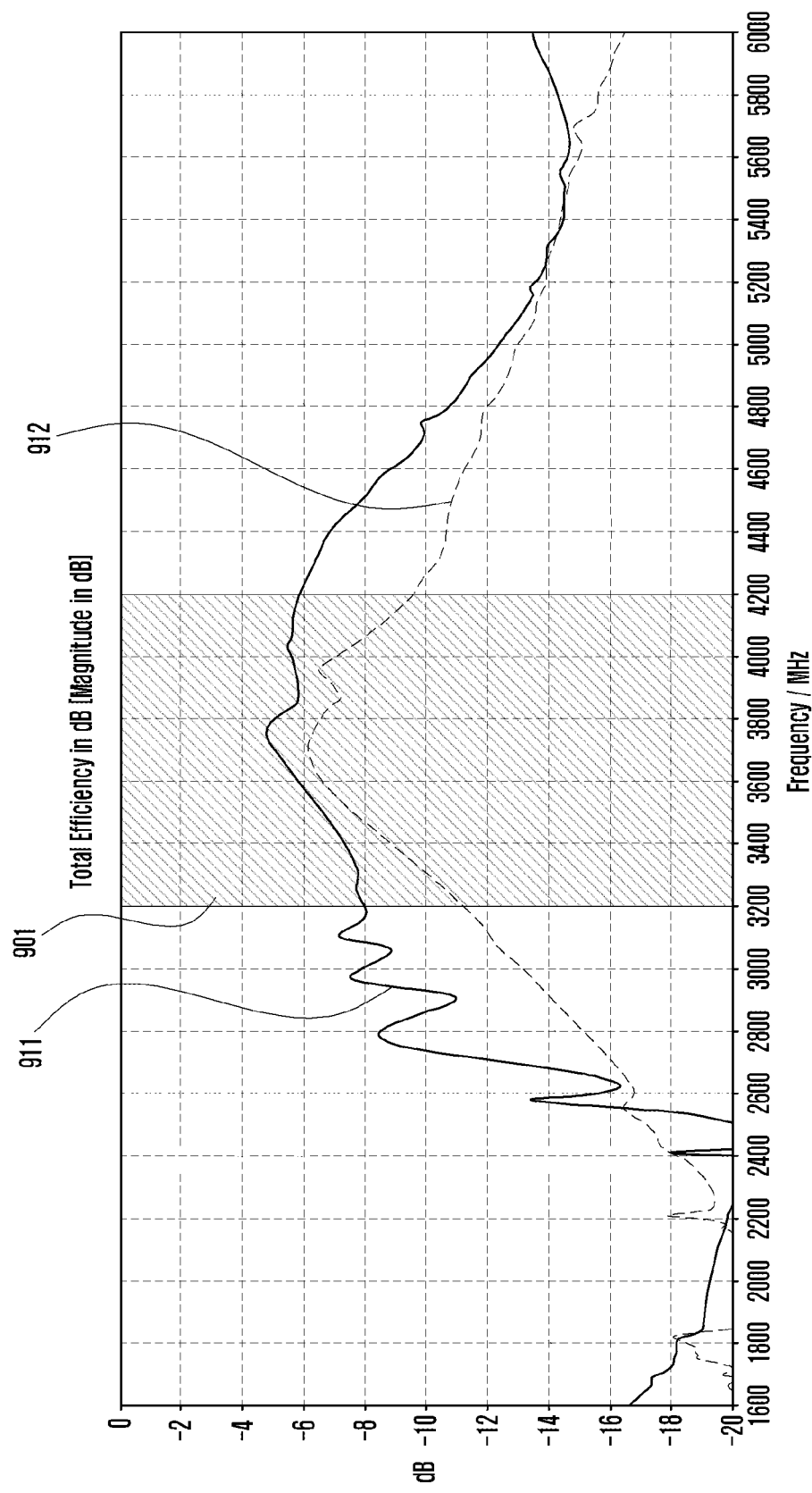
FIG. 9 is a graph illustrating radiation performance of an antenna in the configurations of FIGS. 8A and 8B according to various embodiments.

FIG. 9 is a graph illustrating radiation performance of the antenna in the configurations of FIGS. 8A and 8B according to various embodiments.

From FIGS. 8A, 8B and 9, it may be seen that when overlapping the conductive part 225 (a graph 911) in the slide-in state in a designated frequency band (e.g., a sub-6 band (an area 901)), the antenna structure 215 (e.g., an antenna) maintains a gain of 10 dB or more similar to the slide-out state (a graph 912). This may mean that although the antenna structure 215 overlaps at least a part of the second housing 220 when electromagnetically connected to the conductive part 225 in the slide-in state, the deterioration of radiation performance is reduced because designated performance is generated as in a case where the antenna structure 215 solely operates.

Figure 10A:
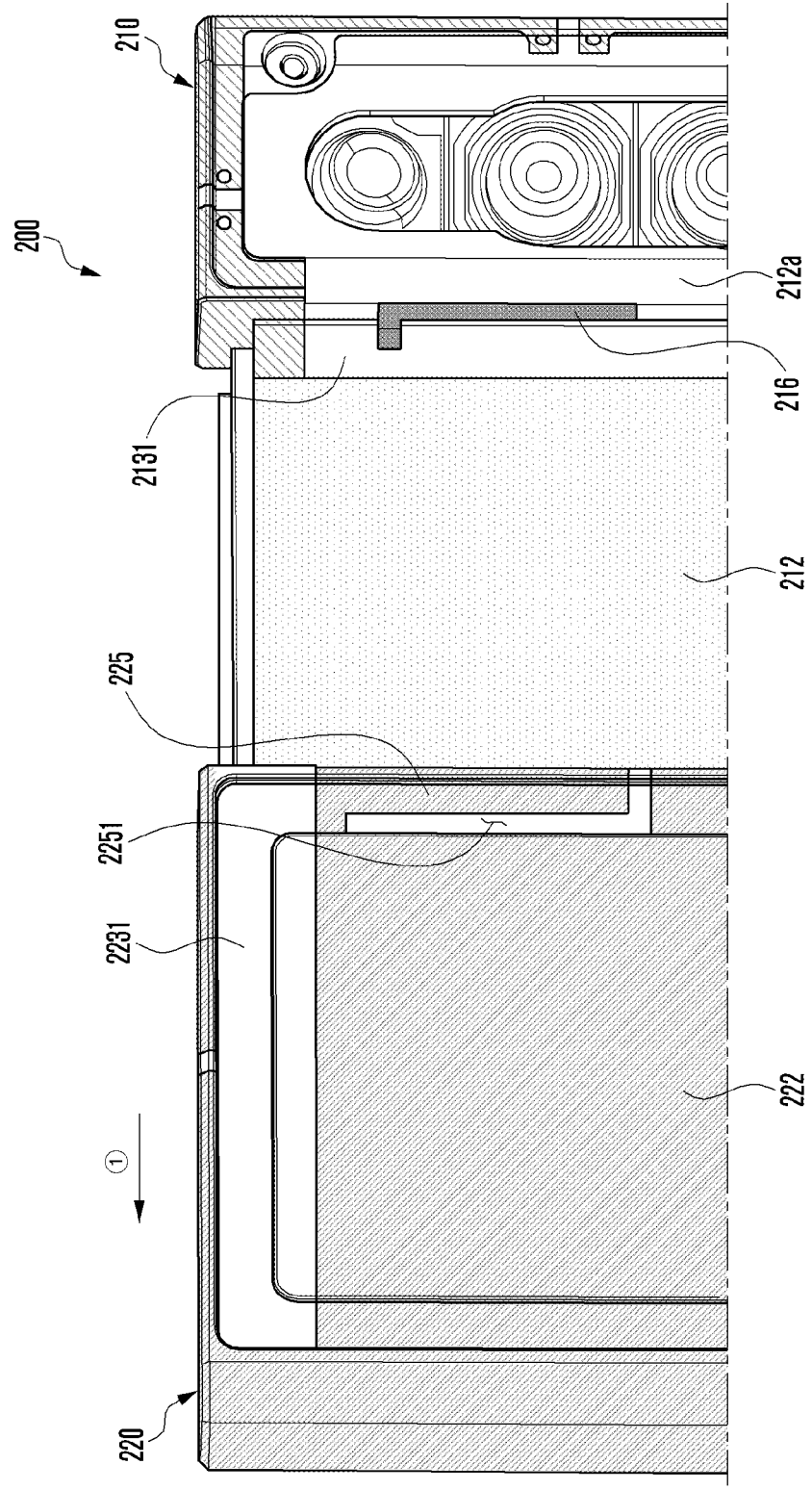
FIGS. 10A and 10B are diagrams illustrating a part of the electronic device including an antenna structure and a conductive part according to various embodiments.
Figure 10B:
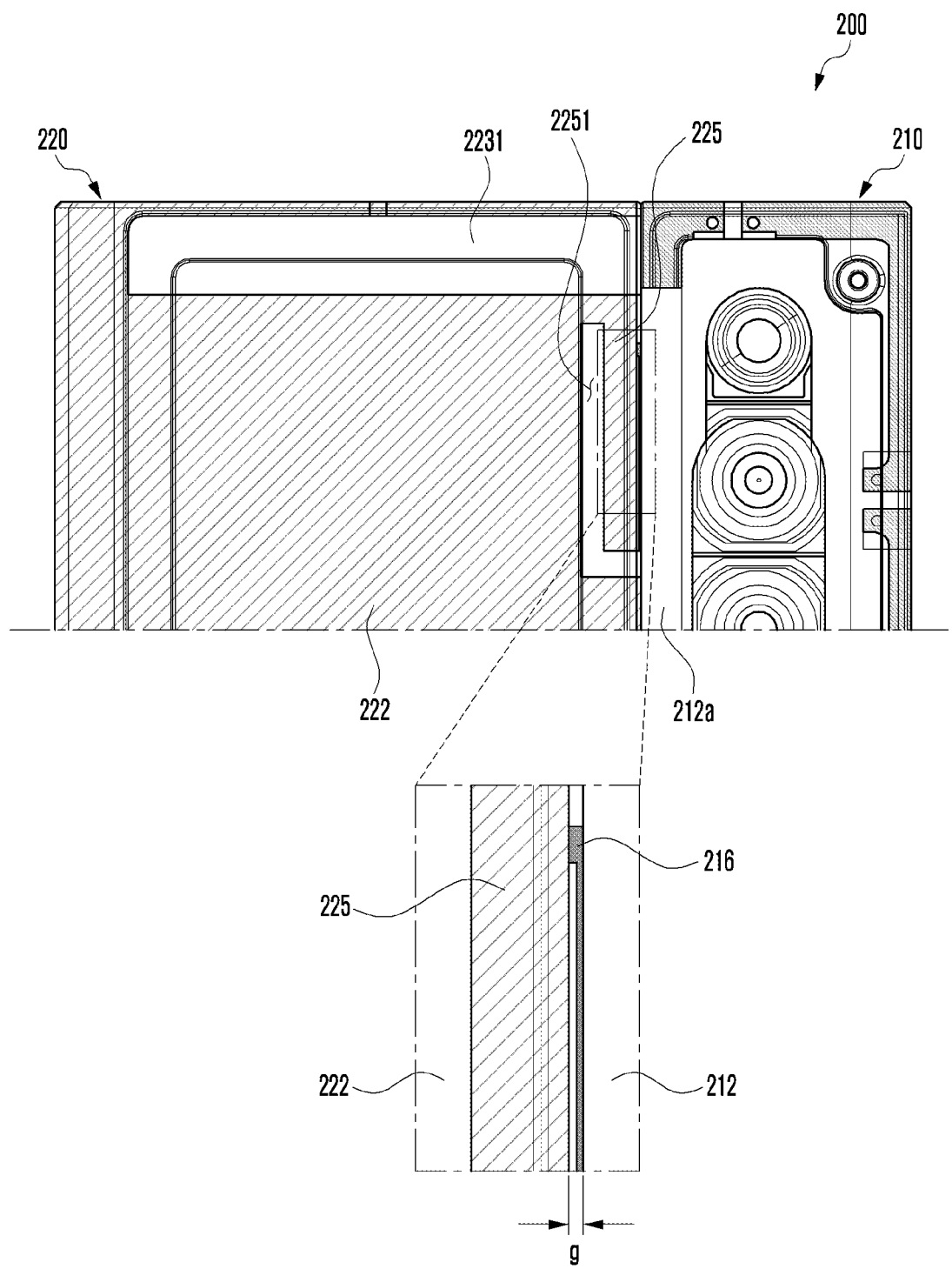

FIGS. 10A and 10B are diagrams illustrating a part of the electronic device including an antenna structure and a conductive part according to various embodiments.

In describing the electronic device 200 of FIGS. 10A and 10B, substantially the same elements as those of the electronic device 200 of FIGS. 8A and 8B have been assigned the same reference numerals, and a detailed description thereof may not be repeated here.

Referring to FIGS. 10A and 10B, the electronic device 200 may include a first housing 210 and a second housing 220 coupled in a way to be slidable in a designated direction (e.g., the direction ①) from the first housing 210. According to an embodiment, the first housing 210 may include a first support member 212. According to an embodiment, the second housing 220 may include a second support member 222. According to an embodiment, the electronic device 200 may operate in such a way that at least a part of the first support member 212 is overlapped to be not seen from the outside by the second support member 222 in the slide-in state. According to an embodiment, the electronic device 200 may include an antenna structure 216 overlapped with at least a part of the second support member 222 and disposed in a corresponding area of the first housing 210 when the first support member 212 is viewed from the top in the slide-in state. According to an embodiment, the electronic device 200 may include a conductive part 225 disposed through a slit 2251 in a way to at least partially overlap the antenna structure 216 when the second support member 222 is viewed from the top in the slide-in state.

According to various embodiments, the conductive part 225 may be disposed at a location capacitively coupled to the antenna structure 216 in the slide-in state. For example, the conductive part 225 may be disposed to have a designated gap "g" through which the conductive part 225 may be capacitively coupled to the antenna structure 216 in the slide-in state. In such a case, it may be advantageous that the antenna structure 216 is formed to be divided through at least one non-conductive part 2131 in the first support member 212 made of a conductive material. According to an embodiment, the conductive part 225 may be adjacent to the antenna structure 216 in a way to be capacitively coupled thereto in a direction parallel and/or perpendicular to a slide-in/slide-out direction (e.g., the direction ①) in the slide-in state.

Figure 11:
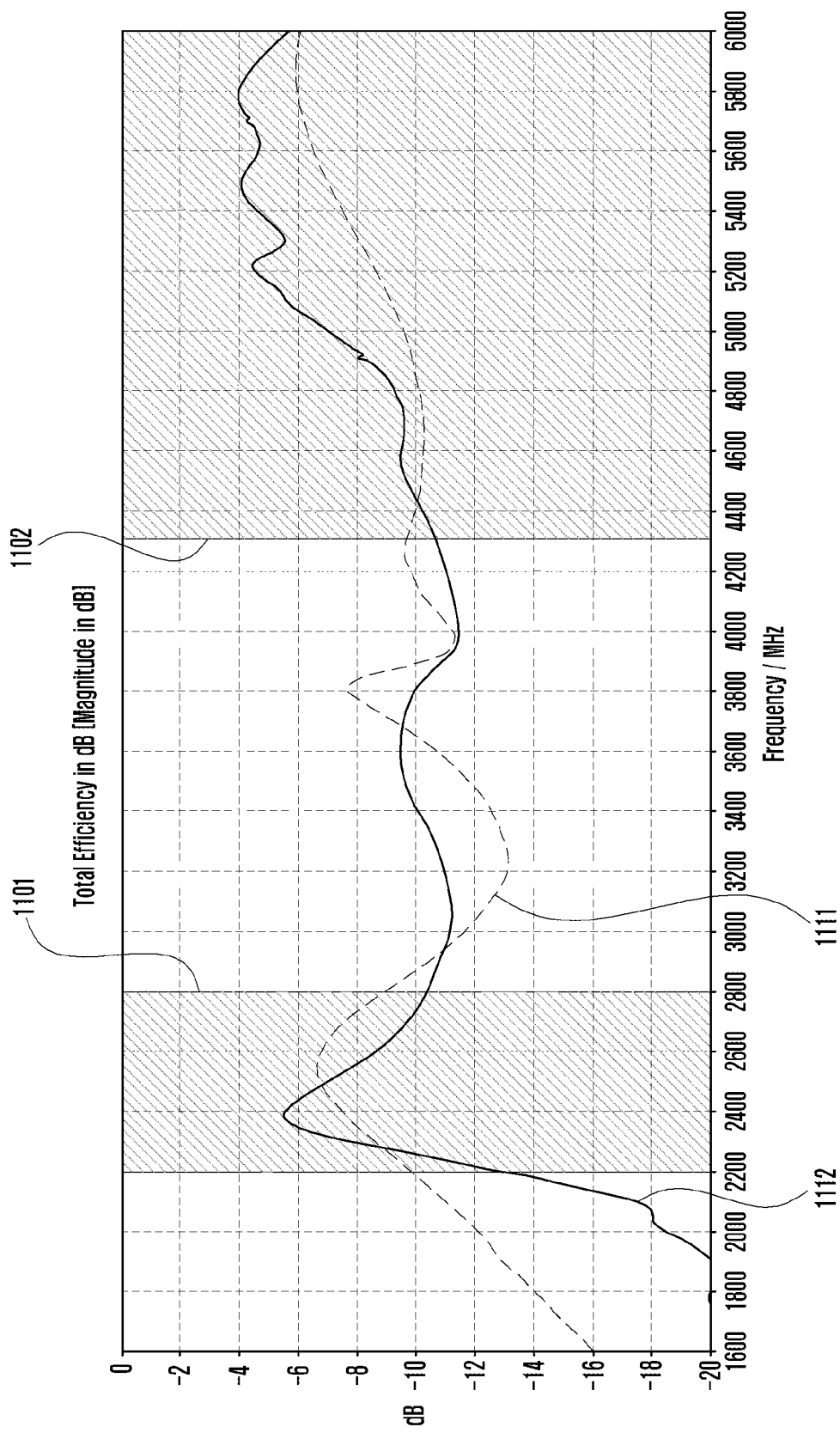
FIG. 11 is a graph illustrating radiation performance of an antenna in the configurations of FIGS. 10A and 10B according to various embodiments.

FIG. 11 is a graph illustrating radiation performance of the antenna in the configurations of FIGS. 10A and 10B according to various embodiments.

From FIGS. 10A, 10B and 11, it may be seen that when being adjacent to the conductive part 225 in a way to be capacitively coupled thereto (a graph 1111) in the slide-in state in designated frequency bands (e.g., a high band (an area 1101) and a sub-6 band (an area 1102)), the antenna structure 216 (e.g., an antenna) maintains a gain of 10 dB or more similar to the slide-out state (a graph 1112). This may mean that the deterioration of radiation performance is reduced because designated performance is generated as in a case where the antenna structure 216 solely operates although the antenna structure 216 overlaps at least a part of the second housing 220 when electrically connected to the conductive part 225 in a way to be capacitively coupled thereto in the slide-in state.

Figure 12:
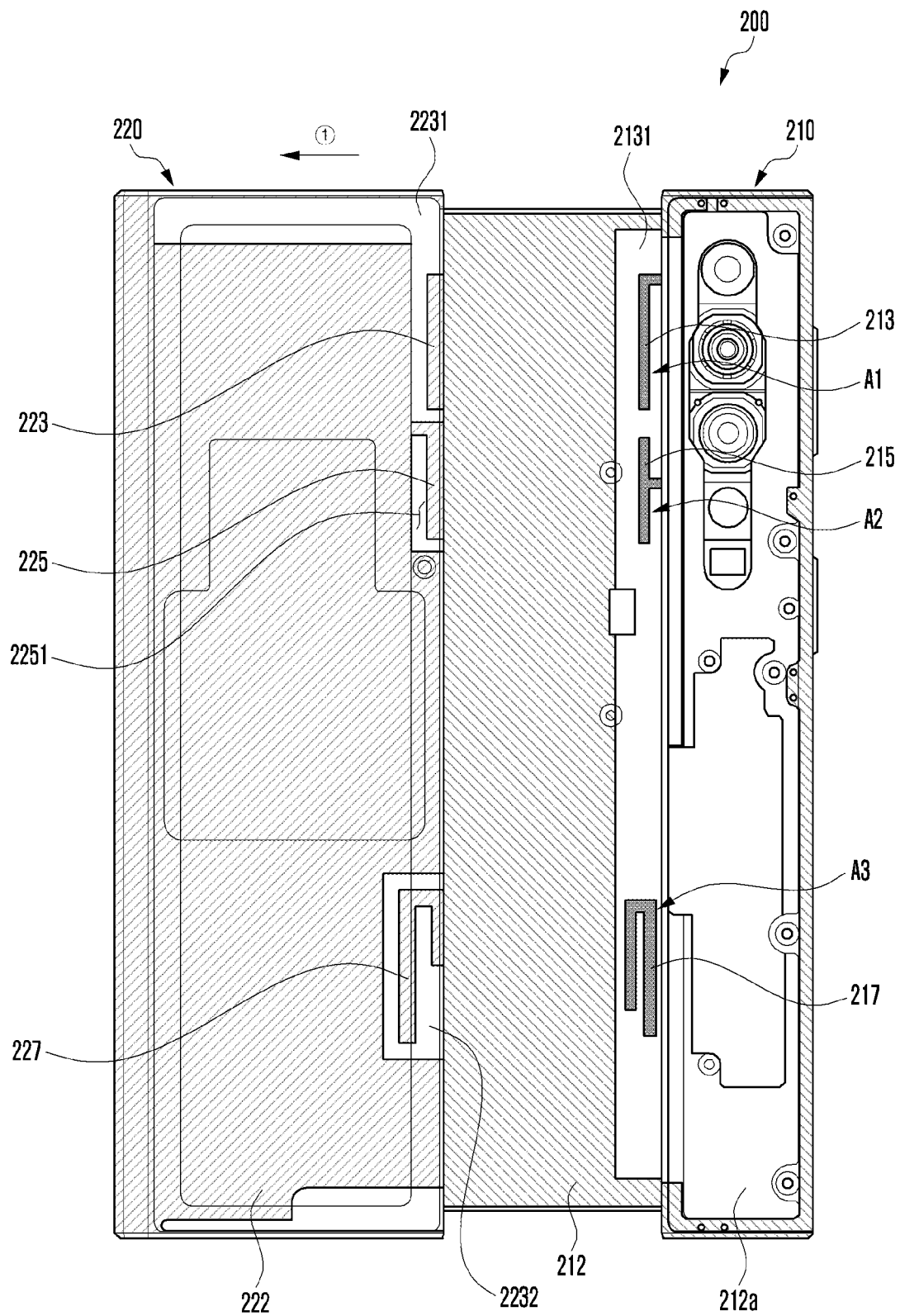
FIG. 12 is a diagram illustrating the electronic device including a plurality of antenna structures and a plurality of conductive parts according to various embodiments.

FIG. 12 is a diagram illustrating an electronic device including a plurality of antenna structures and a plurality of conductive parts according to various embodiments.

Referring to FIG. 12, an electronic device 200 may include a first housing 210 and a second housing 220 coupled in a way to be slidable in a designated direction (e.g., the direction ①) from the first housing 210. According to an embodiment, the first housing 210 may include a first support member 212. According to an embodiment, the second housing 220 may include a second support member 222. According to an embodiment, the electronic device 200 may operate in such a way that at least a part of the first support member 212 is overlapped to be not seen from the outside by the second support member 222 in the slide-in state. According to an embodiment, the electronic device 200 may include antennas A1, A2, and A3 overlapped with at least a part of the second support member 222 and disposed in a corresponding area of the first housing 210 when the first support member 212 is viewed from the top in the slide-in state. According to an embodiment, the antennas A1, A2, and A3 may be formed through a first antenna structure 213, a second antenna structure 215 and/or a third antenna structure 217 disposed to be divided through a non-conductive part 2131 in the first support member 212 made of a conductive material.

According to various embodiments, the electronic device 200 may include conductive parts 223, 225, and 227 disposed to at least partially overlap the antenna structures 213, 215, and 217, respectively, when the first support member 212 is viewed from the top in the slide-in state. According to an embodiment, the conductive parts 223, 225, and 227 may be disposed to be divided or extended through at least one non-conductive part 2231 and 2232 in the second support member 222 made of a conductive material. In an embodiment, the conductive part 225, that is, any one of the conductive parts 223, 225, and 227, may be disposed to include a slit 2251 formed through the non-conductive part 2231. According to an embodiment, the deterioration of radiation performance of the antennas A1, A2, and A3 attributable to interference of the second housing 220 can be reduced through the conductive parts 223, 225, and 227 disposed to overlap the antenna structures 213, 215, and 217 in the slide-in state. In an embodiment, the antennas A1, A2, and A3 may be configured to operate in the same or different frequency bands. In an embodiment, two or more antennas may be formed in the electronic device 200.

According to various example embodiments, an electronic device (e.g., the electronic device 200 in FIG. 3B) includes: a first housing (e.g., the first housing 210 in FIG. 3B) including a first area (e.g., the first area R1 in FIG. 3B), a second housing (e.g., the second housing 220 in FIG. 3B) coupled to be slidable in a first direction (e.g., the direction ① in FIG. 3B) from the first housing and including a second area (e.g., the second area R2 in FIG. 3B) overlapping the first area in a slide-in state, an antenna structure (e.g., the antenna structure 213 in FIG. 3B) disposed in the first housing to overlap the first area when the first housing is viewed from the top, a conductive part (e.g., the conductive part 223 in FIG. 3B) disposed in the second area and electromagnetically connected to the antenna structure in the slide-in state, and wireless communication circuitry (e.g., the wireless communication module 192 in FIG. 1) electrically connected to the antenna structure. The wireless communication circuitry may be configured to transmit and/or receive radio signals in at least one designated frequency band through the antenna structure and the conductive part in the slide-in state.

According to various example embodiments, the wireless communication circuitry may be configured to transmit and/or receive radio signals in the at least one frequency band through the antenna structure in a slide-out state.

According to various example embodiments, the antenna structure may include at least one conductive part divided through at least one non-conductive part in the first area.

According to various example embodiments, the antenna structure may include a conductive pattern disposed in an internal space and/or on an internal surface of the first housing. At least a part of the conductive pattern may be electrically connected to a conductive pad exposed to an external surface of the first housing in the first area.

According to various example embodiments, the electronic device may further include a conductive connection member disposed to be electrically connected to the conductive pad in an internal space of the second housing. The conductive connection member may electrically connect the conductive part to the conductive pad in a second direction substantially perpendicular to the first direction in the slide-in state.

According to various example embodiments, the conductive connection member may include at least one of a conductive spring, a conductive tape or a conductive C-clip.

According to various example embodiments, the antenna structure may be disposed at a location to be capacitively coupled to the conductive part in the slide-in state.

According to various example embodiments, the conductive part may be divided through at least one non-conductive part in the second area.

According to various example embodiments, the conductive part may be disposed to have a length substantially in the same direction as the antenna structure in the second area.

According to various example embodiments, the conductive part may be formed through a slit having a length substantially in the same direction as the antenna structure in the second area.

According to various example embodiments, in the slide-in state, when the first housing is viewed from the top, the antenna structure may be disposed at a location at least partially overlapping the slit.

According to various example embodiments, the first housing may include a first face, a second face facing a direction opposite a direction of the first face, and a first side member at least partially surrounding a first space between the first face and the second face. The second housing may include a third face facing the same direction as the first face, a fourth face facing a direction opposite the direction of the third face, and a second side member at least partially surrounding a second space between the third face and the fourth face.

According to various example embodiments, at least a part of the antenna structure may be disposed in the second face. At least a part of the conductive part may be disposed in the fourth face.

According to various example embodiments, the first side member may include a first support member at least partially extending into the first space. The second side may include a second support member at least partially extending into the second space. In the slide-in state, the first support member and the second support member may at least partially overlap.

According to various example embodiments, the first area may be disposed in at least a part of the first support member. The second area may be disposed in at least a part of the second support member.

According to various example embodiments, the antenna structure may include at least one conductive part divided through at least one non-conductive part in the first support.

According to various example embodiments, the conductive part may include at least one conductive part divided through at least one non-conductive part in the second support member.

According to various example embodiments, the electronic device may further include a bendable member connected to the first housing and received in an internal space of the second housing in a way to be not seen from the outside in the slide-in state, and a flexible display disposed to be supported by the first housing and the bendable member.

According to various example embodiments, the bendable member may be configured to be slid out from the internal space to form a plane substantially identical with a plane of the first housing in the slide-out state.

According to various example embodiments, the flexible display may be disposed to have a first display area in the slide-in state and to have a second display area greater than the first display area in a slide-out state.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
a slidable housing including first portion, and a second portion coupled to be slidable in a first direction from the first portion;
an antenna structure, comprising at least part of an antenna, disposed in the first portion;
a slit disposed in the second portion through a conductive part, the slit at least partially overlapping the antenna structure in a slide-in state; and
wireless communication circuitry electrically connected to the antenna structure,
wherein the wireless communication circuitry is configured to transmit and/or receive signals in at least one frequency band through the antenna structure and the slit in the slide-in state.

2. The electronic device of claim 1, wherein the wireless communication circuitry is configured to transmit and/or receive signals in the at least one frequency band through the antenna structure in a slide-out state.

3. The electronic device of claim 1, wherein the antenna structure comprises at least one conductive part divided through at least one non-conductive part.

4. The electronic device of claim 1, wherein:
the antenna structure comprises a conductive pattern disposed in an internal space and/or on an internal surface of the first portion, and
at least a part of the conductive pattern is electrically connected to a conductive pad exposed to an external surface of the first portion in the first area.

5. The electronic device of claim 4, further comprising a conductive connection member disposed to be electrically connected to the conductive pad in an internal space of the second portion,
wherein the conductive connection member is configured to electrically connect the conductive part to the conductive pad in a second direction substantially perpendicular to the first direction in the slide-in state.

6. The electronic device of claim 5, wherein the conductive connection member comprises at least one of a conductive spring, a conductive tape or a conductive C-clip.

7. The electronic device of claim 1, wherein the antenna structure is disposed at a location capacitively coupled to the conductive part in the slide-in state.

8. The electronic device of claim 1, wherein the conductive part is divided through at least one non-conductive part.

9. The electronic device of claim 1, wherein the conductive part has a length in a direction substantially identical with a direction of the antenna structure.

10. The electronic device of claim 1, wherein the slit has a length in a direction substantially identical with a direction of the antenna structure.

11. The electronic device of claim 10, wherein in the slide-in state, when the first portion is viewed from above, the antenna structure is disposed at a location at least partially overlapping the conductive part.

12. The electronic device of claim 1, wherein:
the first portion comprises a first surface, a second surface facing a direction opposite a direction of the first surface, and a first lateral member at least partially surrounding a first space between the first surface and the second surface, and
the second portion comprises a third surface facing a same direction as the first surface, a fourth surface facing a direction opposite the direction of the third surface, and a second lateral member at least partially surrounding a second space between the third surface and the fourth surface.

13. The electronic device of claim 12, wherein:
at least a part of the antenna structure is disposed in the second surface, and
at least a part of the slit and at least a part of the conductive part are disposed in the fourth surface.

14. The electronic device of claim 12, wherein:
the first lateral member comprises a first support member at least partially extending into the first space,
the second lateral member comprises a second support member at least partially extending into the second space, and
in the slide-in state, the first support member and the second support member at least partially overlap.

15. The electronic device of claim 14, wherein:
the first portion comprises a first area and the second portion comprises a second area overlapping the first area in a slide-in state,
the antenna structure is disposed in the first area,
the slit and the conductive part are disposed in the second area,
the first area is disposed in at least a part of the first support member, and
the second area is disposed in at least a part of the second support member.

16. The electronic device of claim 15, wherein the antenna structure comprises at least one conductive part divided through at least one non-conductive part in the first support member.

17. The electronic device of claim 15, wherein the conductive part comprises at least one conductive part divided through at least one non-conductive part in the second support member.

18. The electronic device of claim 1, further comprising:
a bendable member connected to the first portion and received in an internal space of the second portion to be not seen from an outside in the slide-in state; and
a flexible display disposed to be supported by the first portion and the bendable member.

19. The electronic device of claim 18, wherein the bendable member is configured to be slid out from the internal space to form a plane substantially identical with a plane of the first portion in the slide-out state.

20. The electronic device of claim 19, wherein the flexible display is disposed to have a first display area in the slide-in state and to have a second display area greater than the first display area in a slide-out state.

* * * * *